US012589623B2

(12) United States Patent
Wiegel et al.

(10) Patent No.: US 12,589,623 B2
(45) Date of Patent: Mar. 31, 2026

(54) MANEUVERABLE ERGONOMIC TRAILER STANDS

(71) Applicants: RITE-HITE HOLDING CORPORATION, Milwaukee, WI (US); Joe DiBiase, Woodbridge (CA)

(72) Inventors: Aaron J. Wiegel, Benton, WI (US); Andy Olson, Milwaukee, WI (US); Charles Waugaman, Mequon, WI (US); David Swift, Dubuque, IA (US); Donald Grant, Dubuque, IA (US); Garret Wernecke, Dubuque, IA (US); James Oates, Mequon, WI (US); Jason Dondlinger, Bellevue, IA (US); Joe DiBiase, Woodbridge (CA); Joe Korman, Dubuque, IA (US); Lucas I. Paruch, Dubuque, IA (US); Ronald P. Snyder, Dubuque, IA (US); Tony Duesing, Bellevue, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 18/678,998

(22) Filed: May 30, 2024

(65) Prior Publication Data
US 2024/0308286 A1 Sep. 19, 2024

Related U.S. Application Data

(63) Continuation of application No. 18/167,386, filed on Feb. 10, 2023, now Pat. No. 12,017,491, which is a
(Continued)

(51) Int. Cl.
*B66D 1/66* (2006.01)
*B60B 33/06* (2006.01)
(Continued)

(52) U.S. Cl.
CPC ............ *B60D 1/665* (2013.01); *B60B 33/063* (2013.01); *B66F 3/10* (2013.01); *B66F 3/20* (2013.01);
(Continued)

(58) Field of Classification Search
CPC ......... B60D 1/665; B60B 33/063; B66F 3/10; B66F 3/20; F16M 11/42; F16M 11/24; B60S 9/02; B60S 9/18
See application file for complete search history.

(56) References Cited

U.S. PATENT DOCUMENTS

D151,400 S 10/1948 Poche
2,754,108 A 7/1956 Brown
(Continued)

FOREIGN PATENT DOCUMENTS

CA 1062305 A 9/1979
CA 2894807 A1 12/2015
(Continued)

OTHER PUBLICATIONS

Canadian Intellectual Property Office, "Examiner's Report," issued in connection with Canadian Patent Application No. 3,188,575, dated Jul. 25, 2025, 4 pages.
(Continued)

*Primary Examiner* — Seahee Hong
(74) *Attorney, Agent, or Firm* — Hanley, Flight & Zimmerman, LLC

(57) ABSTRACT

Maneuverable ergonomic trailer stands are disclosed. An example portable trailer stand includes: an elongate upper ledge, a post coupled to the upper ledge, an extendible leg telescopically coupled to the post, the upper ledge being vertically movable to selectively engage and disengage an underside of a trailer based on movement of the extendible leg relative to the post, and a plurality of wheels coupled to
(Continued)

the post, the post to maintain the plurality of wheels at a substantially fixed distance from the upper ledge as the upper ledge is vertically moved, each of the plurality of wheels to be equidistant from a vertical axis traversing through a center of the upper ledge.

20 Claims, 24 Drawing Sheets

Related U.S. Application Data continuation of application No. 16/376,949, filed on Apr. 5, 2019, now Pat. No. 11,602,964.

(60) Provisional application No. 62/654,166, filed on Apr. 6, 2018.

(51) Int. Cl.

| | |
|---|---|
| *B60D 1/66* | (2006.01) |
| *B60S 9/02* | (2006.01) |
| *B60S 9/18* | (2006.01) |
| *B66F 3/10* | (2006.01) |
| *B66F 3/20* | (2006.01) |
| *F16M 11/24* | (2006.01) |
| *F16M 11/42* | (2006.01) |

(52) U.S. Cl.
CPC ............... *F16M 11/42* (2013.01); *B60S 9/02* (2013.01); *B60S 9/18* (2013.01); *F16M 11/24* (2013.01)

(56) References Cited

U.S. PATENT DOCUMENTS

| | | | |
|---|---|---|---|
| 2,816,776 | A | 12/1957 | Nimtz |
| 2,891,764 | A | 6/1959 | Pearne |
| 3,180,282 | A | 4/1965 | Gutridge et al. |
| 3,188,982 | A | 6/1965 | Bergen et al. |
| 3,189,307 | A | 6/1965 | Peterson |
| 3,189,322 | A | 6/1965 | Hadek |
| 3,197,235 | A | 7/1965 | Chieger |
| 3,235,211 | A | 2/1966 | Robinson et al. |
| 3,250,506 | A | 5/1966 | Thouvenelle et al. |
| 3,289,987 | A | 12/1966 | Candlin, Jr. et al. |
| 3,292,802 | A | 12/1966 | Hutchinson |
| 3,337,170 | A | 8/1967 | Remy et al. |
| 3,392,944 | A | 7/1968 | Wyrough |
| 3,490,723 | A | 1/1970 | Atkinson |
| 3,606,219 | A | 9/1971 | Hammonds et al. |
| D226,442 | S | 3/1973 | Rees |
| 3,768,676 | A | 10/1973 | Spitzer |
| D229,985 | S | 1/1974 | Trevena |
| 4,099,695 | A | 7/1978 | Shinn, Jr. |
| 4,183,511 | A | 1/1980 | Marek |
| D269,215 | S | 5/1983 | Caine |
| D269,240 | S | 6/1983 | Kelson |
| D269,420 | S | 6/1983 | McClure, Jr. |
| D291,017 | S | 7/1987 | Magness |
| 4,718,800 | A | 1/1988 | Engle |
| 4,804,162 | A | 2/1989 | Rice |
| 4,824,136 | A | 4/1989 | Baxter |
| D302,063 | S | 7/1989 | Frazier |
| D303,030 | S | 8/1989 | Goldston |
| 5,013,011 | A | 5/1991 | Halloway |
| D332,789 | S | 1/1993 | Rak |
| D335,735 | S | 5/1993 | Isom |
| D335,736 | S | 5/1993 | Isom |
| 5,340,082 | A | 8/1994 | Holloway |
| D363,297 | S | 10/1995 | Yoshikawa |
| 5,509,687 | A | 4/1996 | Thorndike |
| 5,538,225 | A | 7/1996 | Vandenberg |
| D396,669 | S | 8/1998 | Wilson |
| 5,868,379 | A | 2/1999 | Ellis |

| | | | | | |
|---|---|---|---|---|---|
| D414,732 | S | 10/1999 | Redmond | | |
| D419,700 | S | 1/2000 | Shaw et al. | | |
| 6,089,544 | A | 7/2000 | Ellis | | |
| 6,257,167 | B1 | 7/2001 | Joaquim | | |
| D465,632 | S | 11/2002 | Koppes | | |
| 7,159,849 | B2 * | 1/2007 | Raynor | ................... | B66F 17/00 |
| | | | | | 254/126 |
| 7,163,214 | B1 | 1/2007 | Bratton, Sr. | | |
| 7,581,713 | B1 | 9/2009 | Voss | | |
| D636,297 | S | 4/2011 | Wu et al. | | |
| 8,528,929 | B2 | 9/2013 | Kimener | | |
| 8,567,820 | B2 | 10/2013 | Kimener et al. | | |
| 8,714,533 | B2 | 5/2014 | Jenkins | | |
| 8,789,850 | B2 | 7/2014 | Kimener et al. | | |
| 9,159,849 | B2 | 10/2015 | Kämäräinen | | |
| D744,379 | S | 12/2015 | Penner | | |
| 9,327,781 | B2 | 5/2016 | Hopkins | | |
| 9,656,637 | B2 | 5/2017 | Kimener | | |
| 9,969,575 | B2 | 5/2018 | Kimener | | |
| D822,148 | S | 7/2018 | DeBerry et al. | | |
| 10,065,689 | B2 | 9/2018 | Wiegel et al. | | |
| D837,272 | S | 1/2019 | Hewitt et al. | | |
| D862,306 | S | 10/2019 | Porath | | |
| D862,308 | S | 10/2019 | Siegel et al. | | |
| D867,228 | S | 11/2019 | DePietro et al. | | |
| D870,605 | S | 12/2019 | Huebner | | |
| D871,973 | S | 1/2020 | Christensen et al. | | |
| D873,181 | S | 1/2020 | Leonardi | | |
| D873,723 | S | 1/2020 | Borkholder | | |
| D875,620 | S | 2/2020 | Watson | | |
| D879,670 | S | 3/2020 | Borkholder | | |
| D880,376 | S | 4/2020 | Goodner | | |
| D880,377 | S | 4/2020 | Spencer et al. | | |
| D902,793 | S | 11/2020 | Wiegel et al. | | |
| D918,094 | S | 5/2021 | Wu | | |
| D943,461 | S | 2/2022 | Wiegel et al. | | |
| 11,602,964 | B2 | 3/2023 | Wiegel et al. | | |
| D1,056,394 | S | 12/2024 | Xue | | |
| D1,080,124 | S | 6/2025 | Sun | | |
| 2003/0006599 | A1 | 1/2003 | VanDenberg et al. | | |
| 2003/0038454 | A1 | 2/2003 | Valencia | | |
| 2009/0108147 | A1 | 4/2009 | Di Biase | | |
| 2009/0108148 | A1 | 4/2009 | Johnson | | |
| 2011/0024235 | A1 | 2/2011 | Johnson et al. | | |
| 2013/0001922 | A1 | 1/2013 | Kimener et al. | | |
| 2013/0014677 | A1 | 1/2013 | Jussila | | |
| 2013/0099464 | A1 | 4/2013 | Peterson et al. | | |
| 2014/0166950 | A1 * | 6/2014 | Wiegel | ............... | B62D 53/0864 |
| | | | | | 254/2 R |
| 2014/0252194 | A1 | 9/2014 | Hopkins | | |
| 2016/0001749 | A1 | 1/2016 | Kimener | | |
| 2016/0039622 | A1 | 2/2016 | Kimener | | |
| 2017/0137239 | A1 | 5/2017 | Kimener | | |
| 2017/0183174 | A1 | 6/2017 | Kimener | | |
| 2018/0237237 | A1 | 8/2018 | Kimener | | |
| 2018/0354471 | A1 | 12/2018 | Di Biase | | |
| 2019/0061844 | A1 | 2/2019 | Wiegel et al. | | |
| 2019/0270602 | A1 | 9/2019 | Kimener | | |
| 2019/0308855 | A1 | 10/2019 | Wiegel et al. | | |
| 2023/0182519 | A1 | 6/2023 | Wiegel et al. | | |

FOREIGN PATENT DOCUMENTS

| | | | | |
|---|---|---|---|---|
| CA | 2895992 | A1 | | 1/2016 |
| CA | 3096079 | A1 | | 10/2019 |
| CA | 2939412 | C | | 4/2020 |
| CH | 705652 | B1 | | 4/2013 |
| CN | 1113198 | A | | 12/1995 |
| CN | 112218771 | A | | 1/2021 |
| DE | 3016405 | A1 | | 1/1982 |
| DE | 202011101036 | U1 | | 7/2011 |
| EP | 1149669 | A1 | | 10/2001 |
| EP | 3774409 | B1 | | 11/2023 |
| ES | 296849 | A1 | | 5/1964 |
| FR | 2928321 | | * | 9/2009 |
| FR | 2928321 | A1 | * | 9/2009 |
| FR | 3005604 | A1 | | 11/2014 |
| GB | 982006 | A | | 2/1965 |
| KR | 100323803 | B1 | | 6/2002 |

(56)                References Cited

FOREIGN PATENT DOCUMENTS

| NL | 7304600 A | 10/1973 |
| SE | 317269 B | 11/1969 |
| WO | 2019195790 A1 | 10/2019 |

OTHER PUBLICATIONS

Australian Government, IP Australia, "Examination Report No. 1," issued in connection with Australian Patent Application No. 2024204237, dated May 20, 2025, 5 pages.

United States Patent and Trademark Office, "Notice of Allowance and Fee(s) Due," issued in connection with U.S. Appl. No. 29/826,245, dated Feb. 26, 2025, 7 pages.

United States Patent and Trademark Office, "Corrected Notice of Allowability," issued in connection with U.S. Appl. No. 29/826,245, dated March 12, 2025, 4 pages.

European Patent Office, "Communication pursuant to Rules 161(1) and 162 EPC" issued in connection with European Application No. 19719003.6 dated Nov. 13, 2020, 3 pages.

Storax, Product Brochure, Jan. 1, 2009, 16 pages (English Translation not available).

Storax, "Veiligheidsjukken," available at http://www.storaxlaadbmggen.nl/producten/Veiligheidsjukken/268/Veiligheidsjukken/Algemeen, accessed on Sep. 4, 2013, 2 pages.

Saf-Holland Group, "Holland Landing Gear and Accessories Parts Catalog," retrieved from www.safholland.com, Aug. 2014, 185 pages.

United States Patent and Trademark Office, "Requirement for Restriction/Election," issued in connection with U.S. Appl. No. 13/715,512, filed Sep. 15, 2015, 8 pages.

United States Patent and Trademark Office, "Non-Final Office Action," issued in connection with U.S. Appl. No. 13/715,512, filed Jan. 5, 2016, 15 pages.

United States Patent and Trademark Office, "Final Office Action," issued in connection with U.S. Appl. No. 13/715,512 dated Jul. 28, 2016, 19 pages.

United States Patent and Trademark Office, "Non-Final Office Action," issued in connection with U.S. Appl. No. 13/715,512, filed Mar. 21, 2017, 24 pages.

United States Patent ADN Trademark Office, "Final Office Action," issued in connection with U.S. Appl. No. 13/715,512, filed Oct. 17, 2017, 25 pages.

United States Patent and Trademark Office, "Notice of Allowance and Fee(s) Due," issued in connection with U.S. Appl. No. 13/715,512, filed May 3, 2018, 8 pages.

International Searching Authority, "International Search Report and Written Opinion" issued in connection with PCT application No. PCT/US2019/026160, on Sep. 16, 2019 (23 pages).

China National Intellectual Property Administration, "First Office Action," issued in connection with Chinese Patent Application No. 2019800369426, issued on Aug. 31, 2023, 16 pages. English translation included.

International Searching Authority, "Invitation to pay additional fees and, where applicable protest fee" issued in connection with PCT application No. PCT/US2019/026160, on Jun. 14, 2019, 36 pages.

United States Patent and Trademark Office, "Notice of Allowance and Fee(s) Due" issued in connection with U.S. Appl. No. 29/643,347 mailed on Jul. 16, 2020, 7 pages.

United States Patent and Trademark Office, "Non-Final Office Action," issued in connection with U.S. Appl. No. 16/118,761, on Sep. 9, 2020, 17pages.

International Searching Authority, "International Preliminary Report on Patentability," issued in connection with PCT Patent Application No. PCT/US2019/026160, issued on Oct. 6, 2020, 14 pages.

United States Patent and Trademark Office, "Notice of Allowance and Fee(s) Due," issued in connection with U.S. Appl. No. 15/663,471, issued on Mar. 31, 2021, 7 pages.

IP Australia, "Patent Examination Report No. 1," issued in connection with AU Application No. 2019249267, issued on Jul. 22, 2021, 5 pages.

United States Patent and Trademark Office, "Requirement for Restriction / Election," issued in connection with U.S. Appl. No. 16/376,949 dated Sep. 9, 2021, 6 pages.

United States Patent and Trademark Office, "Notice of Allowance and Fee(s) Due" issued in U.S. Appl. No. 29/756,602, filed Oct. 14, 2021, 7 pages.

United States Patent and Trademark Office, "Notice of Allowance," issued in connection with U.S. Appl. No. 29/756,602, filed Nov. 2, 2021, 2 pages.

Canadian Patent Office, "Office Action," issued in connection with CA Patent Application No. 3,096,079 mailed on Nov. 4, 2021, 4 pages.

United States Patent and Trademark Office, "Non-Final Office Action," issued in connection with U.S. Appl. No. 16/376,949 dated Nov. 9, 2021, 14 pages.

IP Australia, "Examination Report No. 2," issued in connection with AU Patent No. 2019249267, issued on Mar. 18, 2022, 7 pages.

IP Australia, "Notice of Acceptance," issued in connection with AU Application No. 2019249267, issued on Jun. 22, 2022, 3 pages.

United States Patent and Trademark Office, "Final Office Action" issued in connection with U.S. Appl. No. 16/376,949 dated Jul. 6, 2022, 11 pages.

Canadian Patent Office, "Notice of Allowance," issued in connection with Canadian Patent Application No. 3,096,079, issued on Sep. 14, 2022, 1 page.

United States Patent and Trademark Office, "Advisory Action," issued in connection with U.S. Appl. No. 16/376,949 dated Sep. 16, 2022, 4 pages.

United States Patent and Trademark Office, "Advisory Action," issued in connection with U.S. Appl. No. 16/376,949 dated Oct. 19, 2022, 3 pages.

IP Australia, "Notice of Grant," issued in connection with AU Application No. 2019249267, issued on Oct. 20, 2022, 1 page.

United States Patent and Trademark Office, "Notice of Allowance and Fee(s) Due," issued in connection with U.S. Appl. No. 16/376,949 dated Nov. 10, 2022, 10 pages.

rite-hite.com, "TS-2000 Trailer Stand Brochure," retrieved on Dec. 2, 2022, 2 pages.

European Patent Office, "Communication under Rule 71(3) EPC," issued in connection with European patent Application No. 19719003.6-1009, dated Mar. 15, 2023, 9 pages.

United States Patent and Trademark Office, "Requirement for Restriction / Election," issued in connection with U.S. Appl. No. 18/167,386, mailed on Jun. 15, 2023, 6 pages.

United States Patent and Trademark Office, "Non-Final Office Action," issued in connection with U.S. Appl. No. 18/167,386, mailed on Aug. 30, 2023, 16 pages.

The State Intellectual Property Office of People's Republic of China, "First Office Action and Search," mailed in connection with Chinese Patent Application No. 201980036942.6, dated Aug. 31, 2023, 16 pages. (English Translation included).

European Patent Office, "Decision to grant a European Patent pursuant to Article 97(1) EPC," issued in connection with European patent Application No. 19719003.6, dated Oct. 19, 2023, 3 pages.

IP Australia, "Examination Report No. 1," issued in connection with Australian Patent Application No. 2022246428, issued on Nov. 16, 2023, 5 pages.

Mexico Patent Office, "First substantive requirement report," issued in connection with Mexican Patent Application No. MX/a/2020/010542, dated Jan. 31, 2024, 6 pages. [Machine English Translation Included.].

European Patent Office, "Extended European Search Report," issued in connection with European Patent Application No. 23205256.3, dated Feb. 13, 2024, 7 pages.

United States Patent and Trademark Office, "Notice of Allowance," issued in connection with U.S. Appl. No. 18/167,386, dated Feb. 15, 2024, 9 pages.

The State Intellectual Property Office of People's Republic of China, "Notification to Grant Patent Right for Invention," issued in

(56) References Cited

OTHER PUBLICATIONS connection with Chinese Patent Application No. 201980036942.6, dated Mar. 4, 2024, 3 pages. (including English translation).

Australian Government, IP Australia, "Notice of Acceptance," issued in connection with AU Patent Application No. 2022246428, dated Mar. 6, 2024, 3 pages.

United States Patent and Trademark Office, "Notice of Allowability," issued in connection with U.S. Appl. No. 18/167,386, dated May 17, 2024, 2 pages.

Canadian Intellectual Property Office, "Examiner Requisition," issued in connection with Canadian Patent Application No. 3,188,575, dated May 30, 2024, 4 pages.

Mexican Patent Office, "Second Substantive Requirement Report," issued in connection with Mexican Patent Application No. MX/a/2020/010542, dated Sep. 26, 2024, 10 pages. [Machine English Translation Included].

IP Australia, "Notice of Grant," issued in connection with AU Application No. 2022246428, issued on Jul. 4, 2024, 1 page.

United States Patent and Trademark Office, "Notice of Allowability," issued in connection with U.S. Appl. No. 18/167,386, dated Mar. 27, 2024, 2 pages.

Rite-Hite Europe, "Trailerjack", Jan. 1, 2000, 3 pages.

European Patent Office, "Communication Pursuant to Article 94(3) EPC" issued on Nov. 11, 2025 in connection with European Patent Application No. 23 205 256.3, 6 pages.

Australian Government, IP Australia," Notice of Acceptance," issued in connection with Australian Patent Application No. 2024204237, issued on Dec. 8, 2025, 3 pages.

United States Patent and Trademark Office, "Notice of Allowance and Fee(s) Due," issued in connection with U.S. Appl. No. 30/004,345, dated Jan. 22, 2026, 6 pages.

* cited by examiner

FIG. 15
FIG. 16
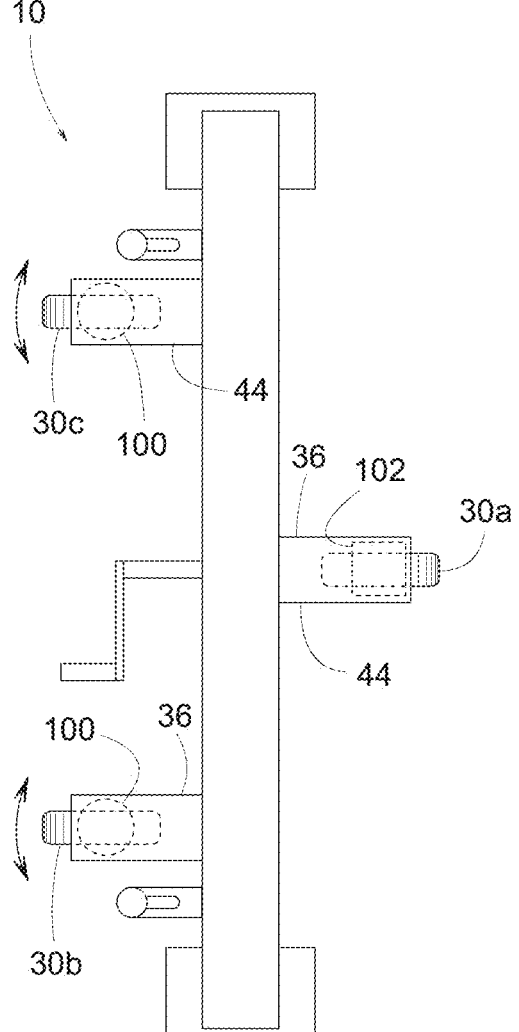
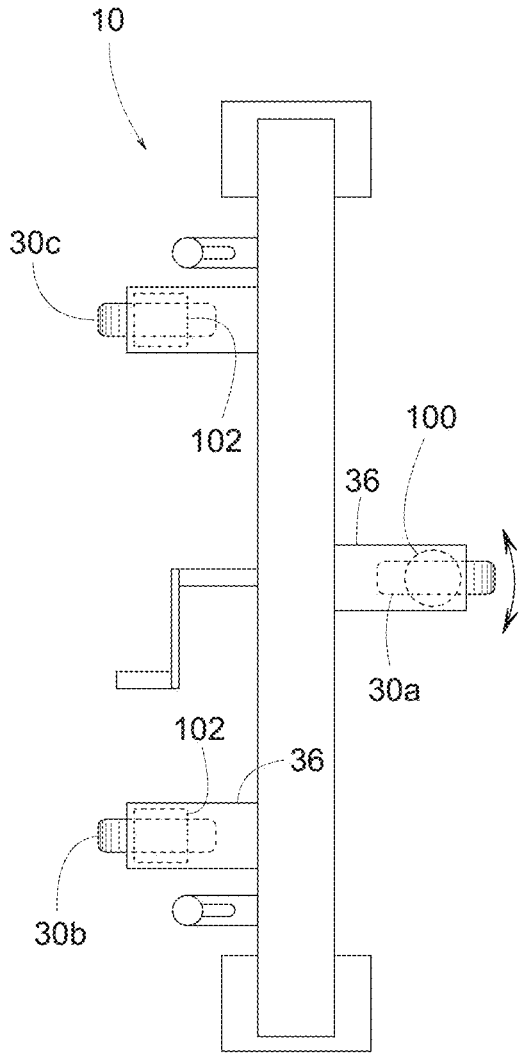

FIG. 46
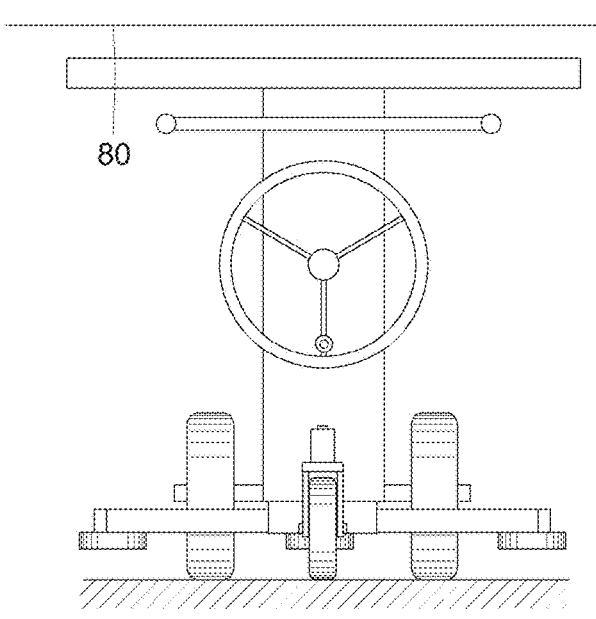
FIG. 47
FIG. 48
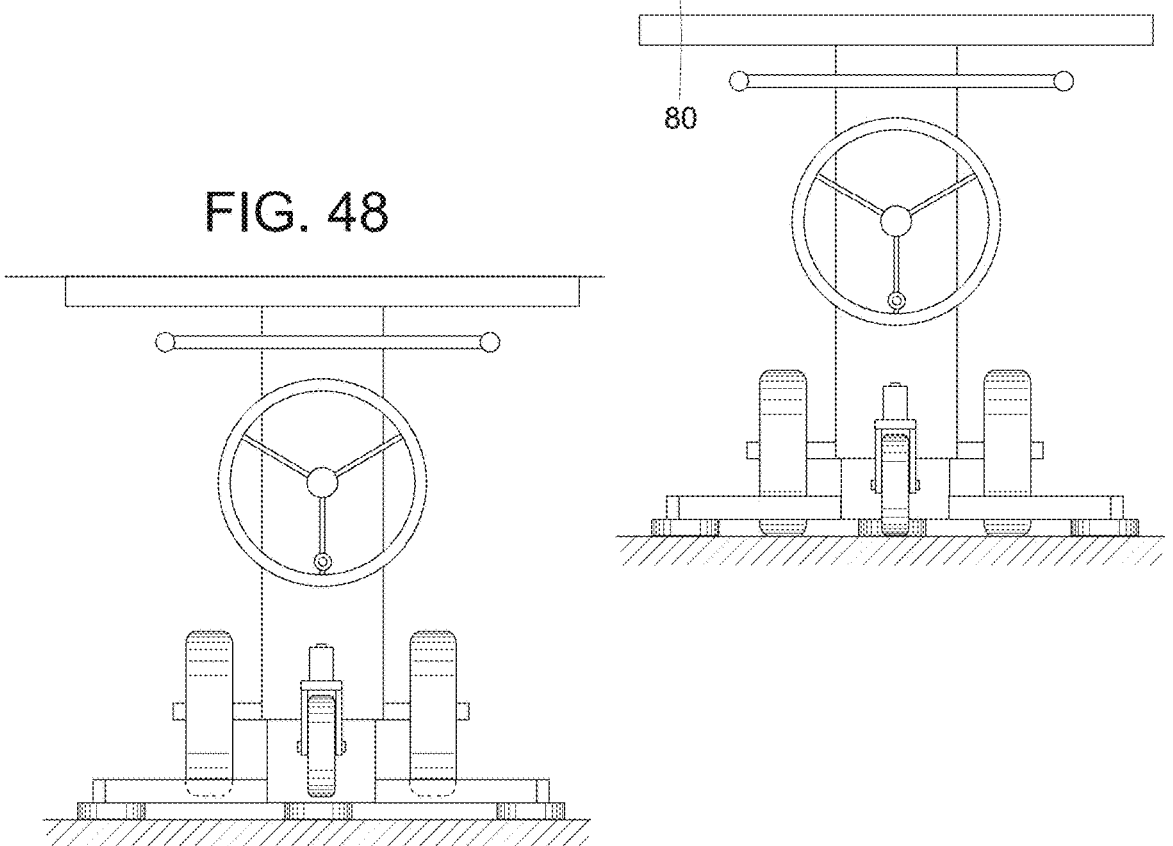

MANEUVERABLE ERGONOMIC TRAILER STANDS

RELATED APPLICATIONS

This patent arises from a continuation of U.S. patent application Ser. No. 18/167,386, which was filed on Feb. 10, 2023, which is a continuation of U.S. patent application Ser. No. 16/376,949 (now U.S. Pat. No. 11,602,964), which was filed on Apr. 5, 2019, which claims the benefit of U.S. Provisional Patent Application No. 62/654,166, which was filed on Apr. 6, 2018. U.S. patent application Ser. No. 18/167,386, U.S. patent application Ser. No. 16/376,949, and U.S. Provisional Patent Application No. 62/654,166 are incorporated herein by reference in their entireties. Priority to U.S. patent application Ser. No. 18/167,386, U.S. patent application Ser. No. 16/376,949, and U.S. Provisional Patent Application No. 62/654,166 is claimed.

FIELD OF THE DISCLOSURE

This disclosure relates generally to trailer stands and more specifically to wheeled stands for stabilizing trailers parked at loading docks.

BACKGROUND

Trucks often back their trailers into loading docks to load or unload the trailer's cargo from the rear end of the trailer. In some cases, the trailer's landing gear, near the front of the trailer, is deployed so that the truck (tractor) can depart while leaving the trailer parked at the dock. The landing gear then supports the front end of the trailer, which was previously supported by the truck. For additional support, sometimes a trailer stand is positioned underneath the front end of the trailer.

BRIEF DESCRIPTION OF THE DRAWINGS

FIG. 15 is a top view of the example trailer stand shown in FIG. 1, with two rear wheels that can swivel while the front wheel is fixed.

FIG. 16 is a top view similar to FIG. 15 but with the front wheel being able to swivel while the two rear wheels are fixed.

Figures 17, 18, 19:
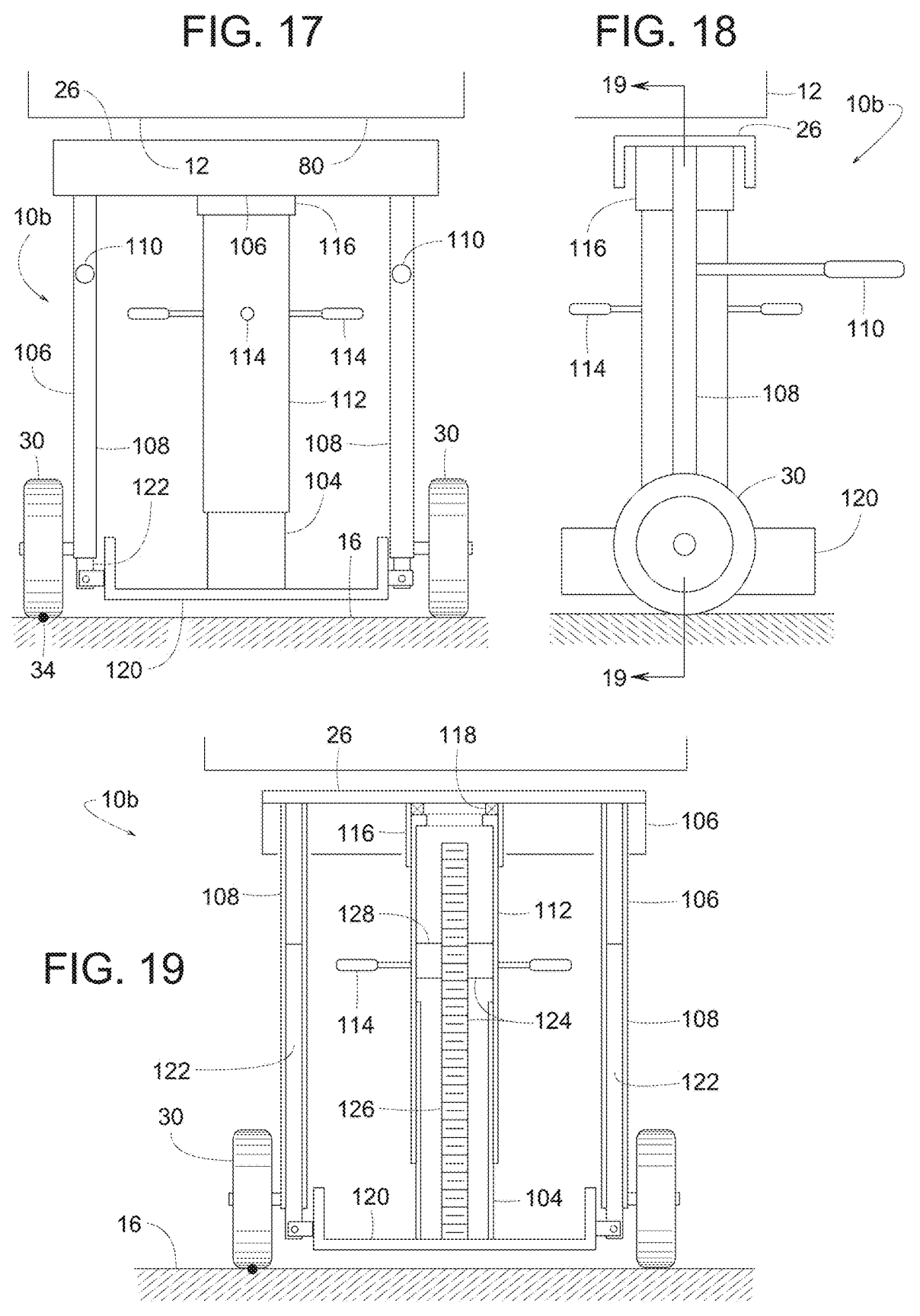

FIG. 17 is a front view of another example trailer stand in a transition mode.

FIG. 18 is a side view of FIG. 17.

FIG. 19 is a cross-sectional view taken along line 19-19 of FIG. 18.

FIG. 46 is a front view of the example trailer stand shown in FIG. 43 shown in a transition mode.

FIG. 47 is a front view of the example trailer stand of FIG. 43 shown in an operation mode.

FIG. 48 is a front view of the example trailer stand of FIG. 43 shown in a bracing mode.

DETAILED DESCRIPTION

Example portable trailer stands for stabilizing parked trailers are disclosed herein. Some example trailer stands have three wheels, which are mounted in a tripod arrangement for stability and for enabling multiple trailer stands to be stored in a compact nested formation. In some examples, the trailer stands include two legs that are vertically extendible by a manual crank that is centrally located between the two legs. Some example trailer stands have a horizontally elongate upper ledge for engaging the underside of a trailer and a vertically adjustable lower foot for bracing the trailer stand when in use. Although the height of the upper ledge can be adjusted, it remains at a fixed vertical distance from the trailer stand's wheels. So, as the upper ledge rises to engage the underside of the trailer, the wheels lift off the ground to avoid being overloaded by the trailer's weight.

Figure 1:
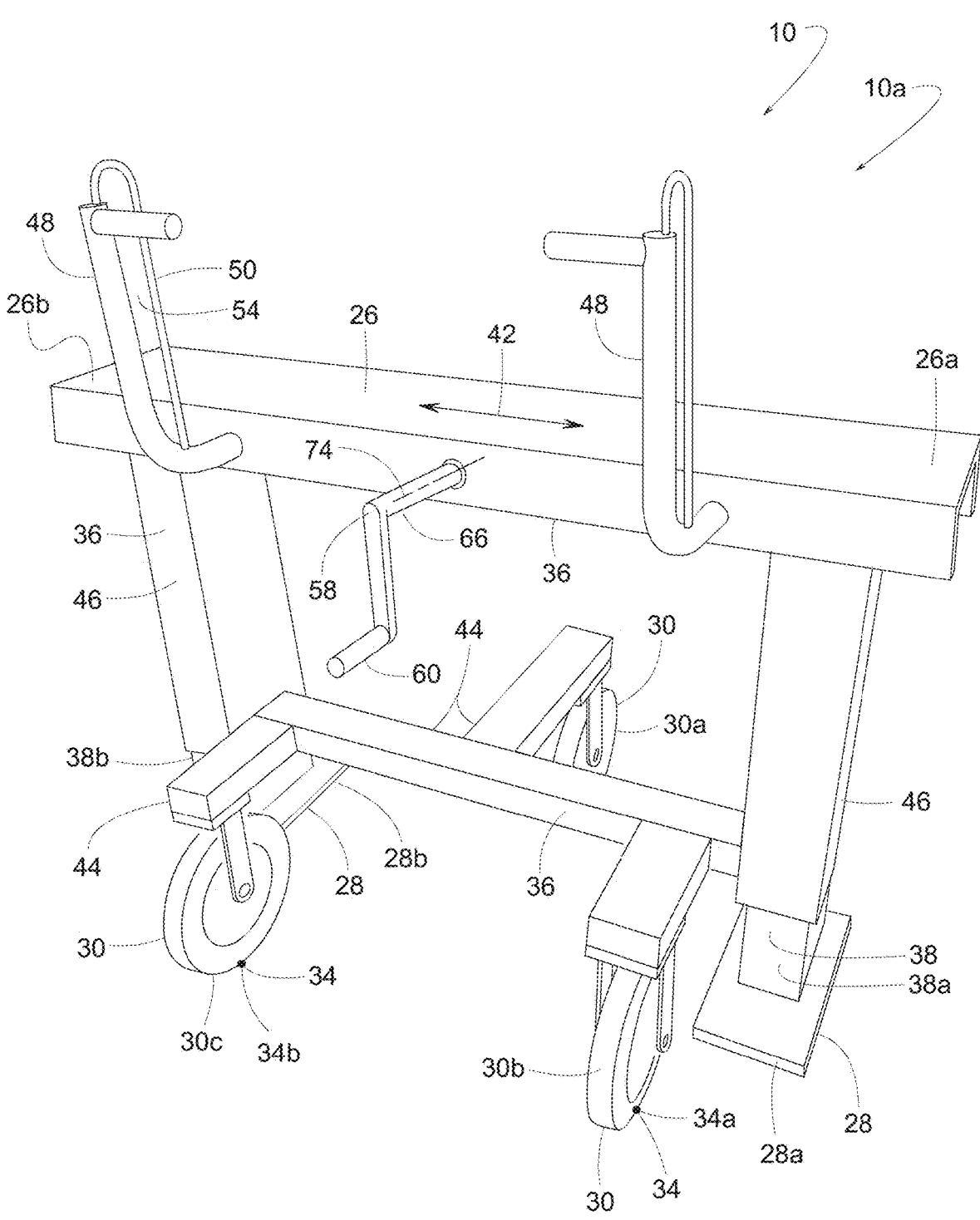
FIG. 1 is a perspective view of an example trailer stand.
Figure 2:
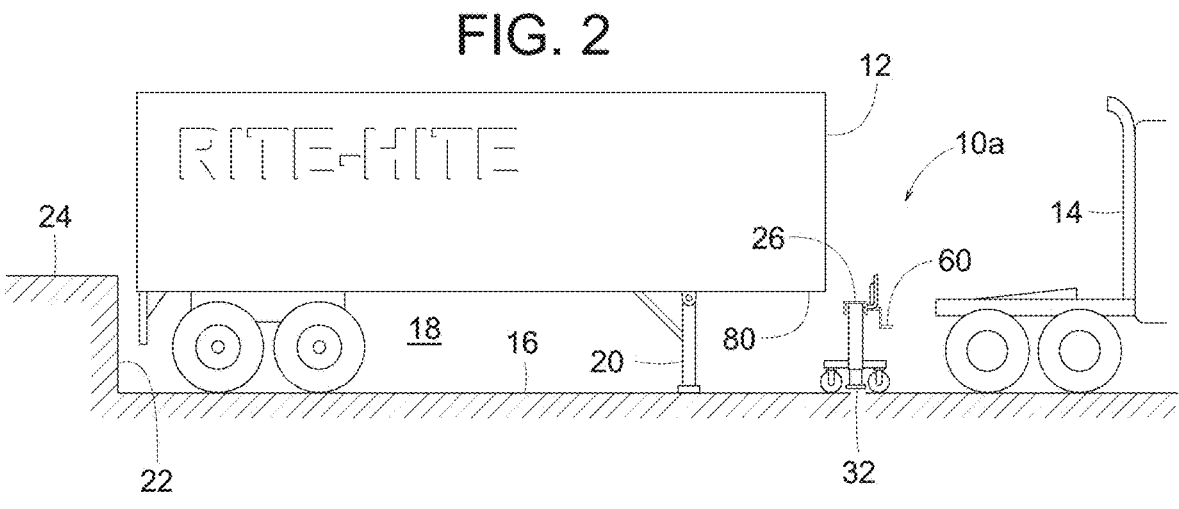
FIG. 2 is a side view of the example trailer stand of FIG. 1, showing the trailer stand in a transition mode near the front end of a parked trailer.
Figure 3:
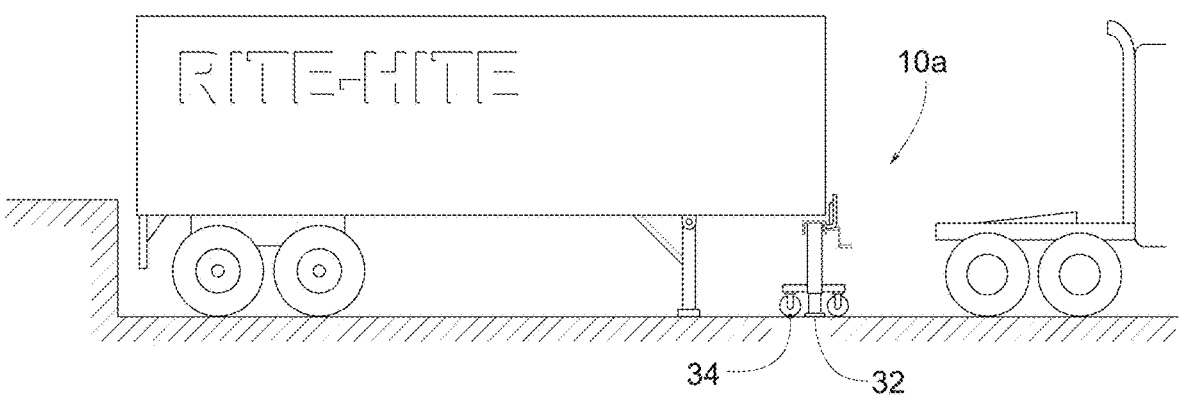
FIG. 3 is a side view similar to FIG. 2 but showing the trailer stand in an operation mode underneath the trailer.
Figure 4:
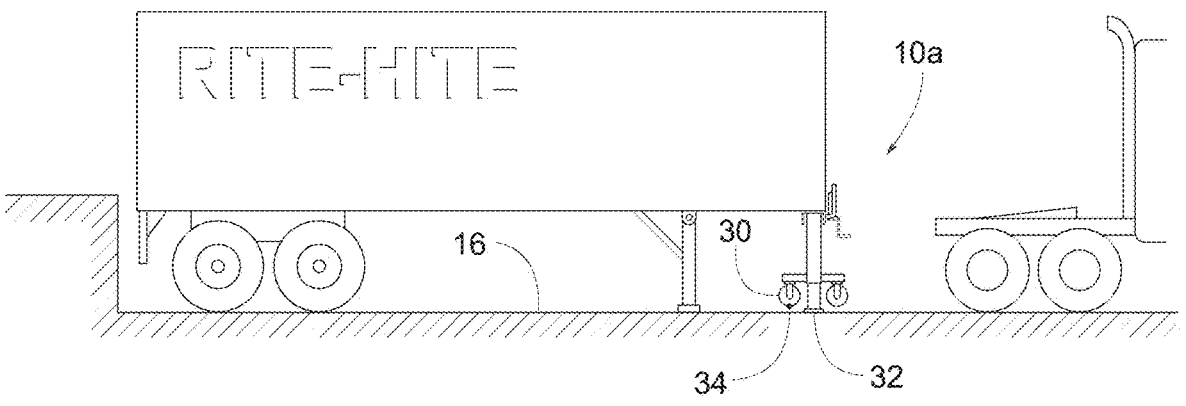
FIG. 4 is a side view similar to FIG. 2 but showing the trailer stand in a bracing mode.

FIGS. 1-36 show aspects of various example trailer stands 10 (e.g., 10a, 10', 10a" and 10b) used for supporting a parked trailer 12. FIG. 1 shows a perspective view of trailer stand 10a, and FIGS. 2-4 show a truck 14 (also known as a tractor) having left trailer 12 parked on a driveway 16 of a loading dock 18. In the illustrated example, the trailer's onboard landing gear 20 is deployed to support the front end of trailer 12, which was previously supported by truck 14 before departing. Even though trailer 12 has its own landing gear 20 for support, trailer stand 10 helps stabilize trailer 12 and provides backup support should the trailer's landing gear 20 collapse or otherwise fail.

Although the illustrated examples show trailer stand 10 being used at a loading dock 18 with a dock face 22 and an elevated platform 24, trailer stand 10 can actually be used for supporting trailer 12 on any driveway. The term, "driveway" refers to any surface upon which a trailer 12 can travel or park. Examples of driveway 16 include a parking lot, a yard, a road, a shoulder of a road, a platform, a deck, etc. The terms, "maneuverable" and "portable," when used with reference to trailer stand 10 mean that trailer stand 10 includes at least one wheel for wheeling trailer stand 10 along a driveway from one location to another (e.g., from underneath one trailer to underneath another one).

Figure 5:
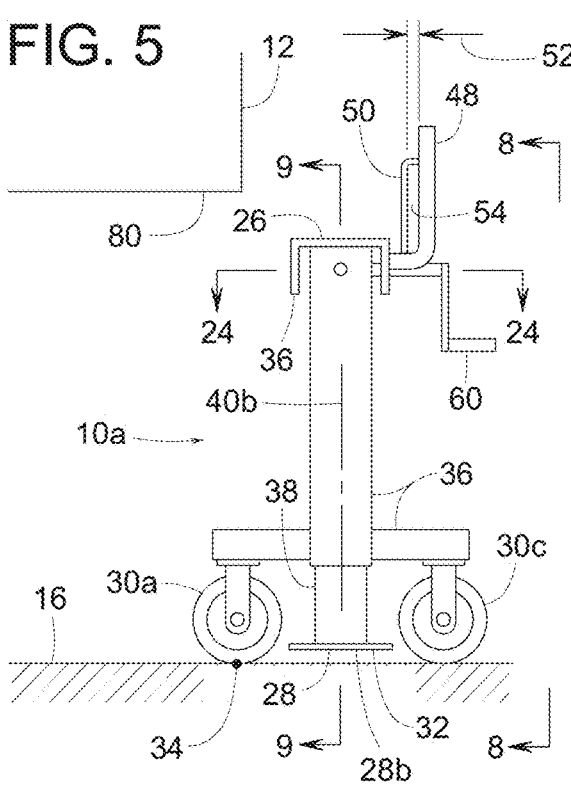
FIG. 5 is an enlarged view of the example trailer stand shown in FIG. 2.
Figure 6:
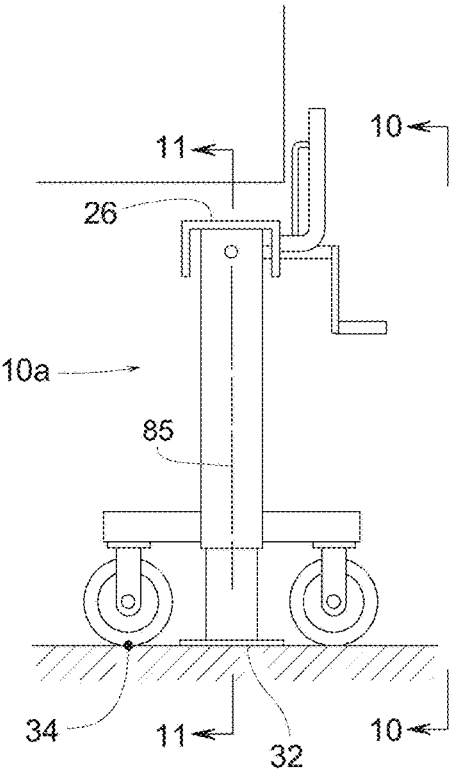
FIG. 6 is an enlarged view of the example trailer stand shown in FIG. 3.
Figure 7:
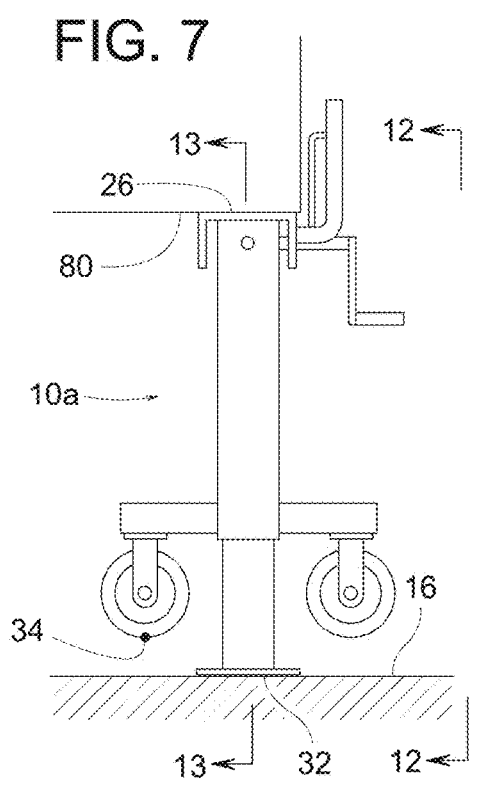
FIG. 7 is an enlarged view of the example trailer stand shown in FIG. 4.
Figure 8:
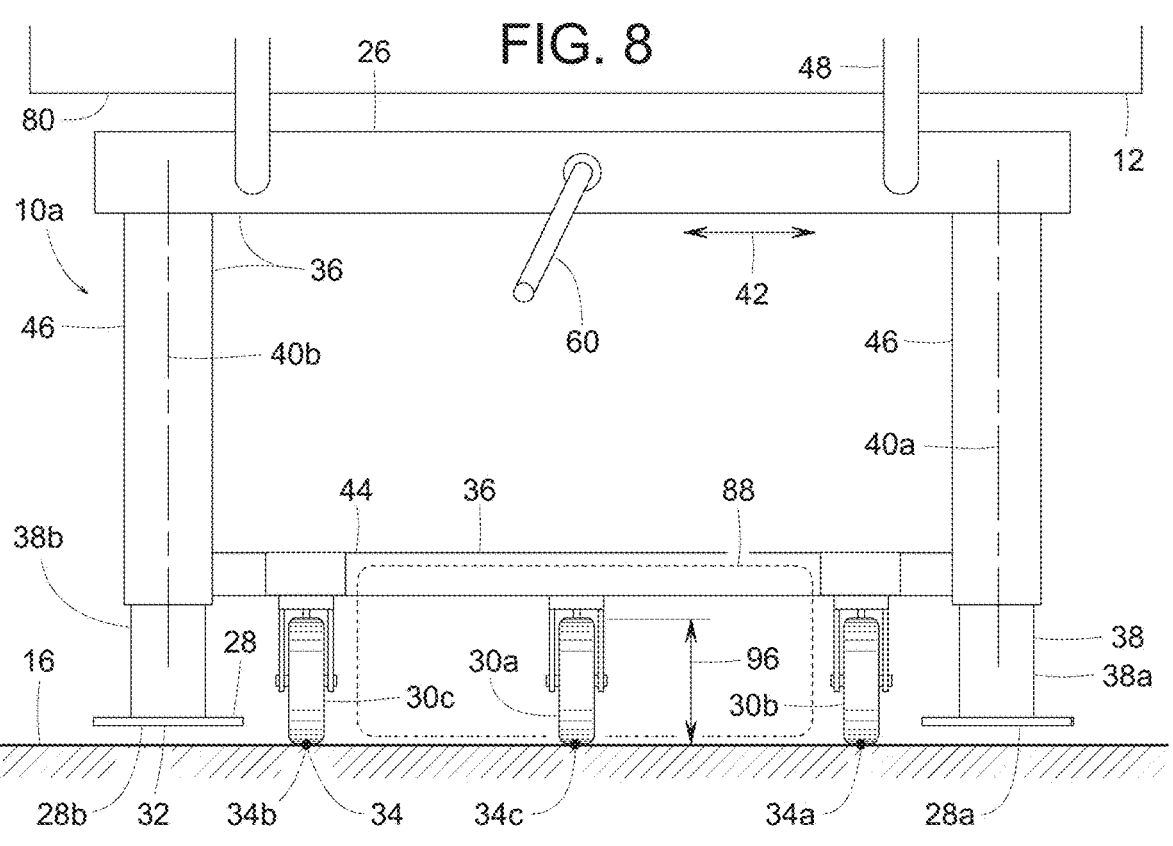
FIG. 8 is a front view taken along line 8-8 of FIG. 5.
Figure 9:
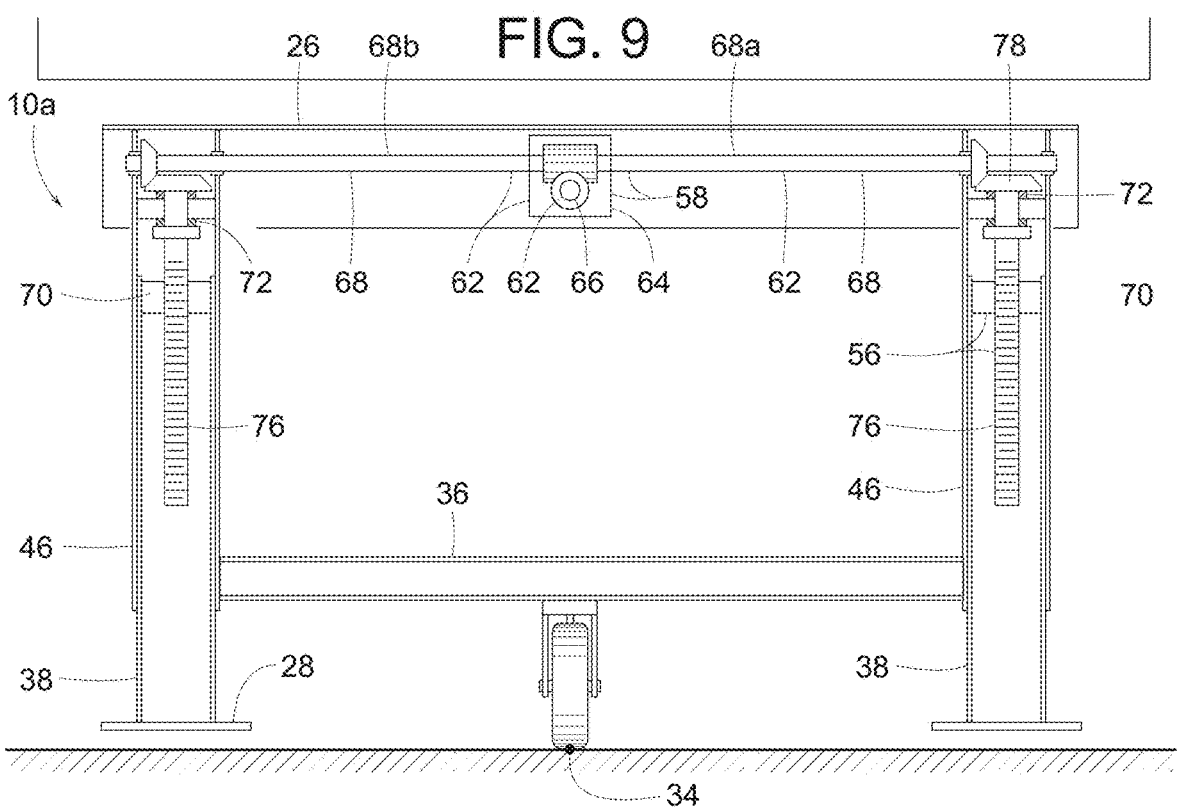
FIG. 9 is a cross-sectional view taken along line 9-9 of FIG. 5.
Figure 10:
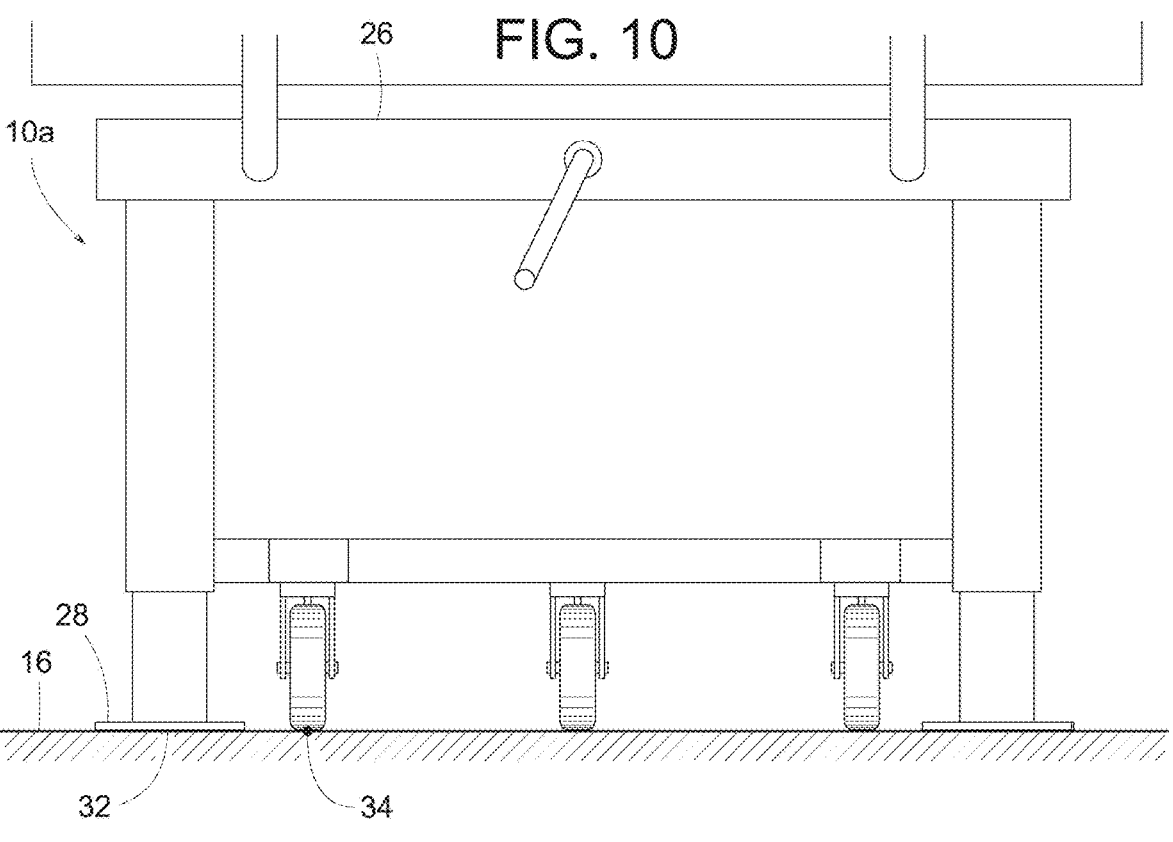
FIG. 10 is a front view taken along line 10-10 of FIG. 6.
Figure 11:
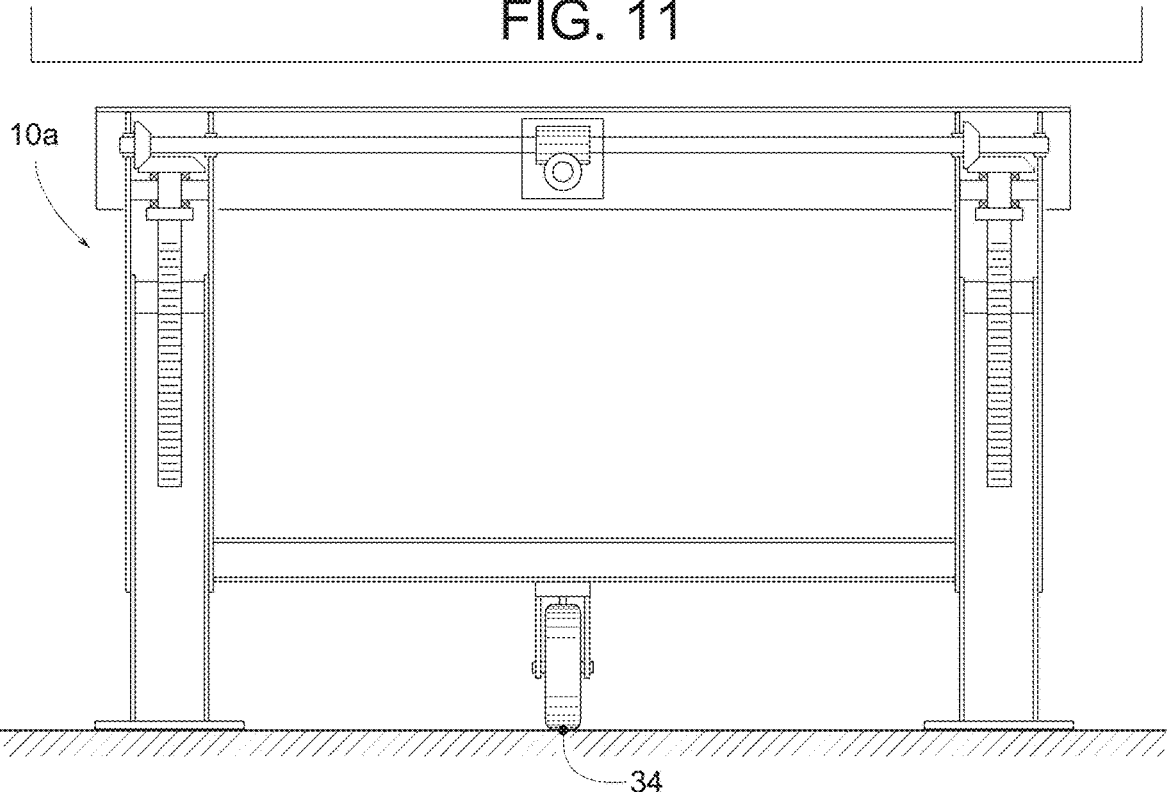
FIG. 11 is a cross-sectional view taken along line 11-11 of FIG. 6.
Figure 12:
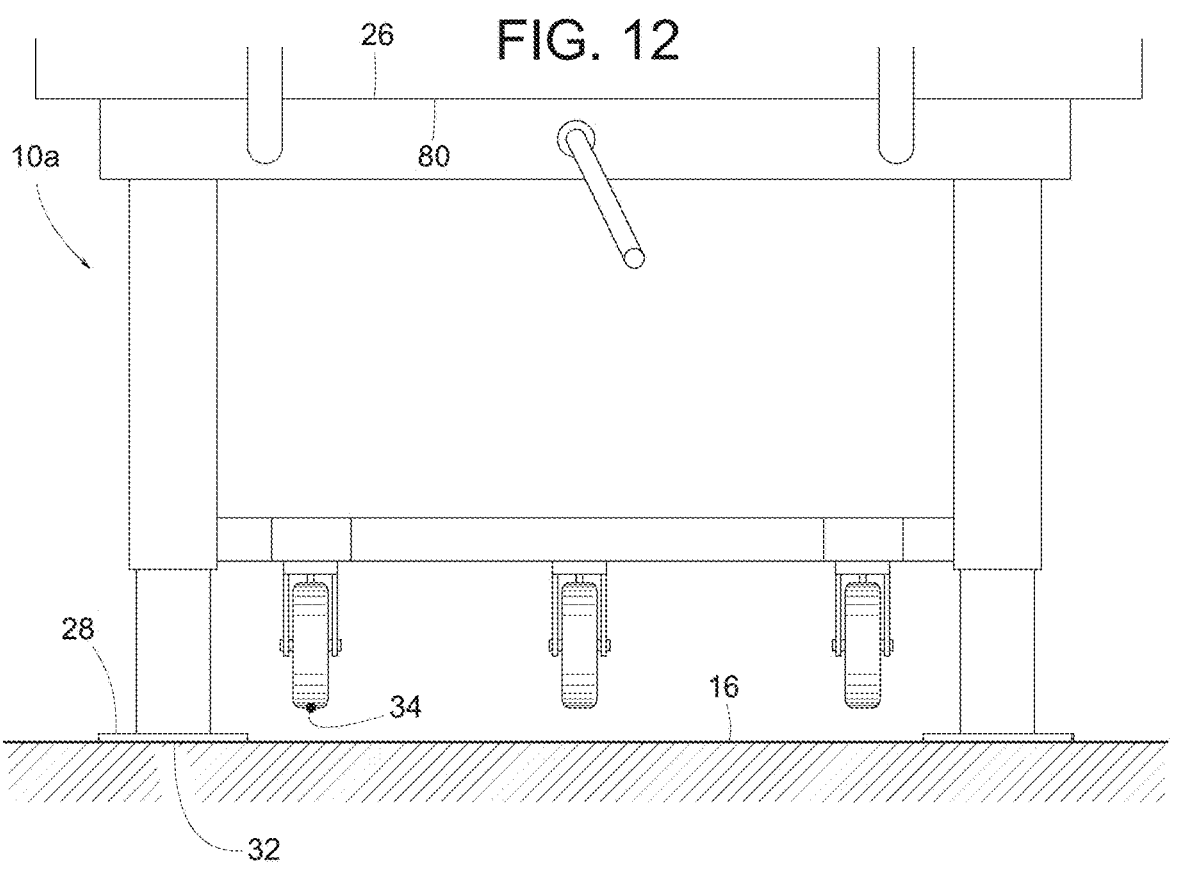
FIG. 12 is a front view taken along line 12-12 of FIG. 7.
Figure 13:
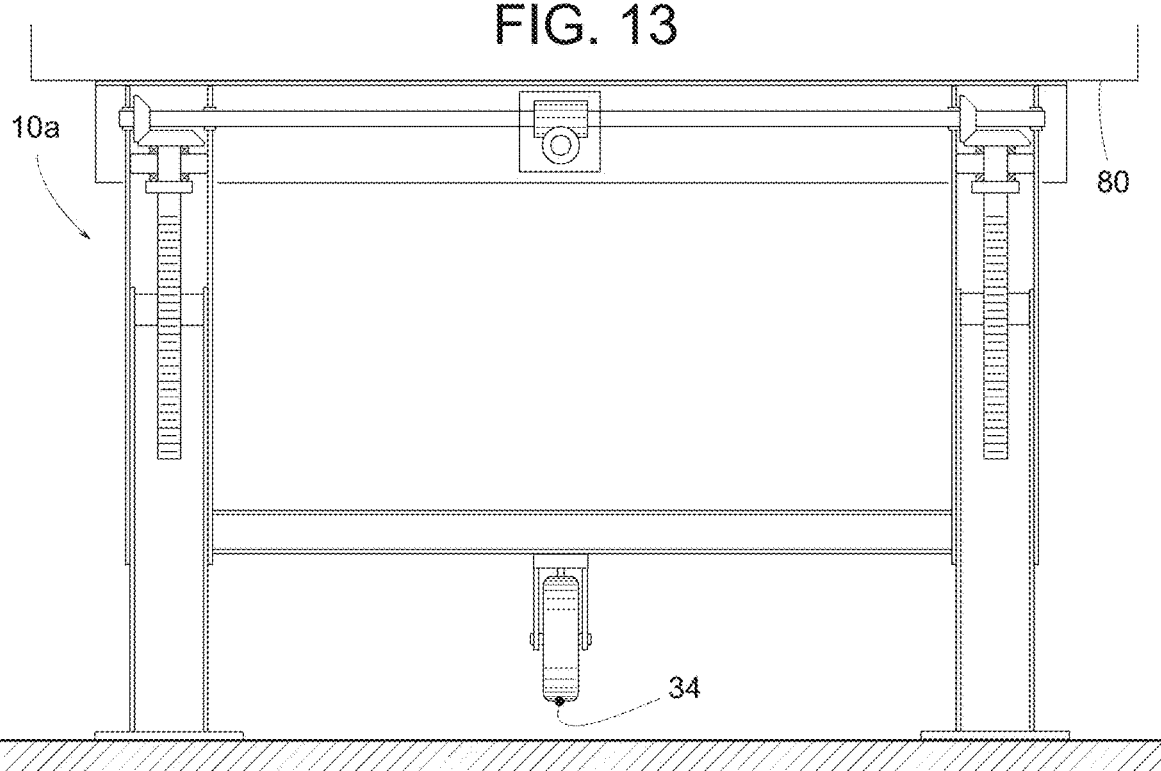
FIG. 13 is a cross-sectional view taken along line 13-13 of FIG. 7.

FIGS. 2, 3 and 4 illustrate example trailer stand 10a having an upper ledge 26, a foot 28 (e.g., a first foot 28a and a second foot 28b), and a wheel/caster 30 (e.g., a front wheel 30a, a right rear wheel 30b, and a left rear wheel 30c) that can be selectively adjusted between three different modes: a transition mode, an operation mode and a bracing mode. The trailer stand's three modes are shown with more detail in FIGS. 5-13. FIGS. 5, 8 and 9 further illustrate the transition mode shown in FIG. 2. FIGS. 6, 10 and 11 illustrate the operation mode shown in FIG. 3. And FIGS. 7, 12 and 13 illustrate the bracing mode shown in FIG. 4.

FIG. 2 shows trailer stand 10a in a transition mode, with the wheel in contact with the ground and a bottom surface 32 of foot 28 above a lowermost point 34 of wheel 30, so trailer stand 10 can be rolled around without foot 28 in contact with the driveway 16. When wheel 30 is rolling along driveway 16, the wheel's lowermost point 34 is where wheel 30 contacts driveway 16. In some examples, the trailer stand 10a is in a transition mode when the bottom surface 32 of the foot 28 is above the lowermost point 34 of the wheel 30 while the upper ledge 26 is below the underside of the trailer 12. The weight of the trailer stand 10a is supported by only the wheel 30 in the transition mode.

FIG. 3 shows trailer stand 10a in an operation mode, with the bottom surface 32 of the foot 28 in contact with the ground at about the same elevation as the lowermost point 34 of the wheel 30. In some examples, the trailer stand 10 is in an operation mode when the bottom surface 32 of the foot 28 is in contact with the ground and/or the lowermost point 34 of the wheel 30 is above the bottom surface of the foot 28 while the upper ledge 26 is below the underside of the trailer 12 (i.e., between transition mode and bracing mode). The weight of the trailer stand 10 is supported by the wheel 30 and the foot 28 or only the foot 28 in the operation mode.

FIG. 4 shows trailer stand 10a in a bracing mode, with the upper ledge 26 in contact with the underside of the trailer 12 and the foot's bottom surface 32 lower than the wheel's lowermost point 34, so the trailer 12 is supported by the trailer stand 10 through the foot 28. The weight of the trailer stand 10 is supported by only the foot 28 in the bracing mode. In some examples, the trailer stand 10 experiences a downward force from the trailer 12 in the bracing mode. In the example shown in FIGS. 1-13, trailer stand 10a comprises a frame 36 and a leg 38 (e.g., a first vertically extendible leg 38a with first foot 28a, and a second vertically extendible leg 38b with a second foot 28b). In some examples, the trailer stand includes one or more legs that are manufactured for use as landing gear for a trailer. As such the legs are designed to bear the combined weight of the portion of the trailer, the cargo, and loading/unloading equipment and personnel not borne by the rear axis/wheels of the trailer. First extendible leg 38a defines a first leg axis 40a along which first leg 38a extends. Second extendible leg 38b defines a second leg axis 40b along which second leg 38b extends. In some examples, frame 36 includes upper ledge 26, which is elongate in a longitudinal direction 42 to provide broad support over a significant width of trailer 12. Some examples of frame 36 also include a lower subframe 44 and a hollow post 46 (e.g., a first hollow post 46a and a second hollow post 46b).

In some examples, subframe 44 connects to posts 46, legs 38 extend and retract within posts 46, and wheels 30 are attached to the subframe 44 for moving (i.e., rolling) trailer stand 10 to different locations on driveway 16. To make moving/positioning trailer stand 10a easier, some examples include one or more handles 48 that extend from the upper ledge 26. In the illustrated example, the handles each include a vertical portion, a horizontal portion, and a longitudinal portion and are positioned with respect to the trailer stand to enable ergonomic movement by operators of various statures. The vertical portion is elongated such that an operator can grip the handles at an optimal position for their height. Alternatively or in addition, the trailer stand can include a handle with an elongated longitudinal portion. In some examples, a finger guard 50 spaced a certain horizontal distance 52 from handle 48 creates a hand-receiving space 54 therebetween, so an operator can safely grip handle 48 and maneuver the trailer stand without the risk of getting a hand pinched between handle 48 and an adjacent edge of trailer 12. In some examples, the finger guard 50 can function as a stop/spacer to prevent the trailer stand from being positioned too far (horizontally) underneath the trailer 12. That is, in some examples, both the handle 48 and the finger guard 50 extend higher than the upper ledge 26 at locations that are horizontally offset relative to the upper ledge, with the handle 48 being farther away from the upper ledge 26 than the finger guard 50. The offset locations of the handle 48 and the finger guard 50 enable an entire width of the upper ledge 26 to be positioned underneath the trailer 12 to support the trailer 12. In some examples, the extent to which the upper ledge 26 is positioned under the trailer 12 is limited by the finger guards abutting the side (e.g., back end) of the trailer 12.

Some examples of trailer stand 10a also include a jackscrew 56 in each leg 38a and 38b, and a mechanical drive unit 58 for rotating each jackscrew 56. In the example illustrated in FIGS. 9 and 24, mechanical drive unit 58 includes a crank 60 and a drive mechanism 62 connecting crank 60 to each jackscrew 56. Some examples of drive mechanism 62 include a gearbox 64, a crank shaft 66 (input shaft to gearbox 64), and one or more output shafts 68 (e.g., a first shaft 68a and a second shaft 68b) connecting gearbox 64 to each jackscrew 56.

Each jackscrew 56 includes a screw 76 and a nut 70. In the illustrated example, nut 70 is welded or otherwise attached to leg 38, screw 76 screws into nut 70, and leg 38 telescopically fits within post 46. Rotating screw 76 within nut 70 forces legs 38 to extend or retract, as the upper end of screw 76 is axially fixed relative to post 46. Bearings 72 facilitate the screw's rotation within post 42 and handle the screw's upward axial thrust.

In the illustrated example of trailer stand 10a, legs 38 are raised and lowered by manually turning crank 60 to rotate crank shaft 66 (input shaft) about a crank axis 74. A set of gears in gearbox 64 uses the crank shaft's rotation to rotate both output shafts 68. Gearbox 64 is schematically illustrated to represent any meshing gear assembly coupling an input shaft to at least one output shaft (e.g., a chain and sprocket, cogged belt with pulleys, any pulley belt system, etc.). In some examples, gearbox 64 includes a plurality of bevel gears so the input shaft runs perpendicular to the output shaft. In some examples, gearbox 64 is a known differential. Each output shaft 68, driven by the rotation of crank shaft 66 through gearbox 64, rotates a set of meshing bevel gears 78 that turn screws 76 of jackscrews 56. In other examples, meshing bevel gears 78 can alternatively be a chain and sprocket, cogged belt with pulleys, any pulley belt system, etc.

In the illustrated example, crank axis 74 is substantially perpendicular to longitudinal direction 42 and centrally located between the two extendible legs 38a and 38b and handles 48 to enable the operator to position (in longitudinal and horizontal directions) and adjust (in vertical direction) the trailer stand 10 from the same position with respect to the trailer stand (i.e., front center in this example).

One example operating sequence begins with manually maneuvering trailer stand 10 into position underneath the trailer 12, as shown in FIGS. 2, 5, 8, and 9 while the trailer stand 10 is in its transition mode, so the wheel 30 is in rolling contact with the driveway 16, the foot 28 is slightly elevated so as not to drag on the driveway 16, and the upper ledge 26 is sufficiently low to fit underneath the trailer 12.

Once properly positioned underneath the trailer 12, the crank 60 is turned to vertically adjust the trailer stand 10. While only the wheel 30 is in contact with the driveway 16, the trailer stand 10 is still in transition mode. The trailer stand 10 is vertically adjusted into the operation mode, once the foot 28 comes in contact with the driveway, as shown in FIGS. 3, 6, 10, and 11. In the operation mode, the trailer stand 10 is in broad, stable supporting contact with the driveway 16 and is in position to limit the trailer's unintended downward movement (from falling all the way to the ground) if necessary.

To further support the trailer 12 and minimize the distance the trailer can fall, additional vertical adjustment (turning of the crank 60) moves the upper ledge 26 into contact with the trailer's underside 80, thereby adjusting the trailer stand 10 into the bracing mode, as shown in FIGS. 4, 7, 12, and 13. In the bracing mode, the upper ledge 26 is solidly up against the trailer's underside 80 while the wheel 30 is lifted up off of and the foot 28 is in contact with the driveway 16. In the bracing mode, any force the trailer 12 exerts down against the upper ledge 26 is transmitted through the leg 38 to driveway 16 rather than transmitted through the wheel 30. This helps protect wheel 30 from being overloaded by the trailer's weight or moving (longitudinally or horizontally) in response to forces exerted by the trailer.

Figure 14:
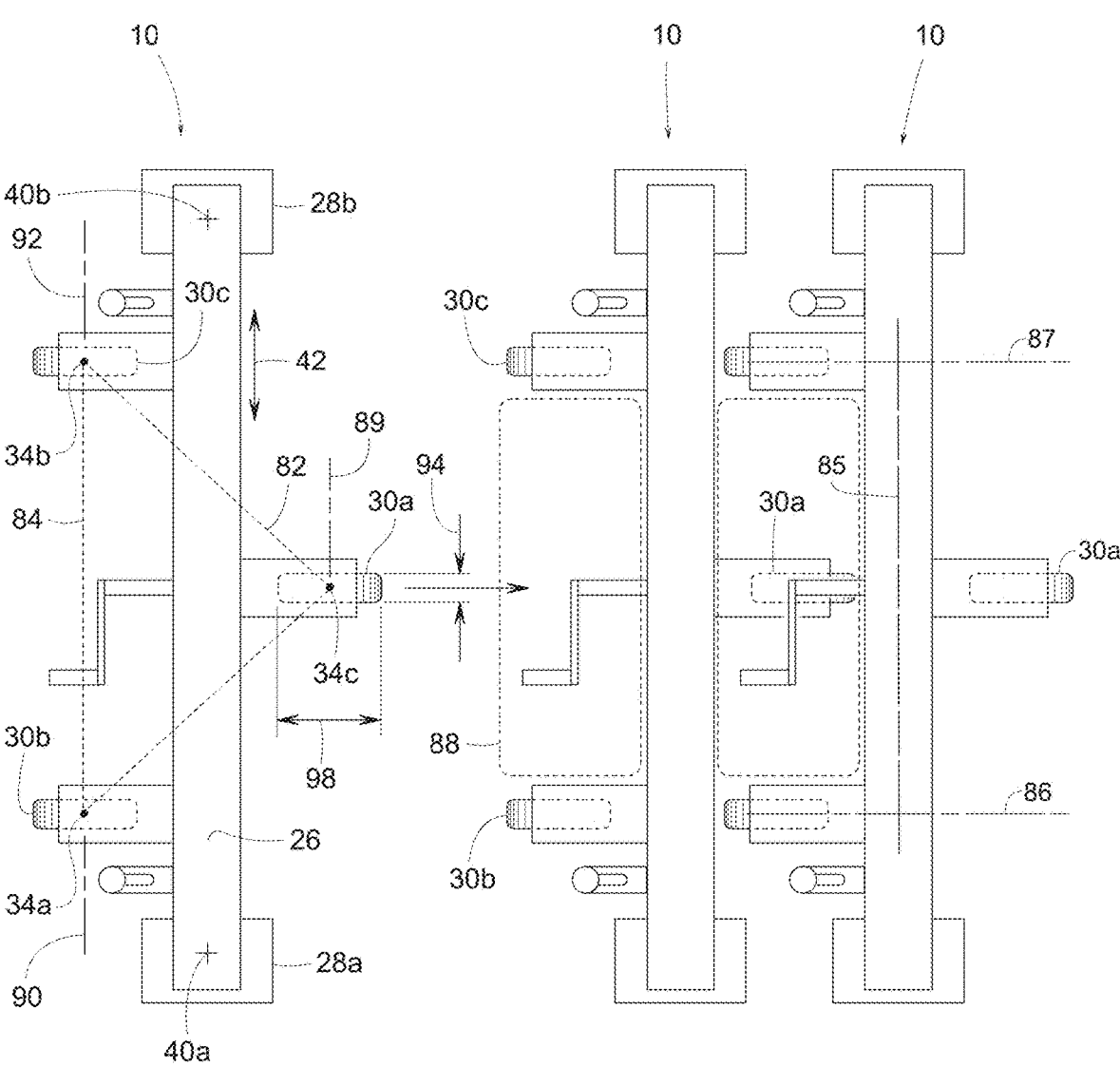
FIG. 14 is a top view of a plurality of the example trailer stand shown in FIG. 1 arranged in a compact nested formation.
Figure 20:
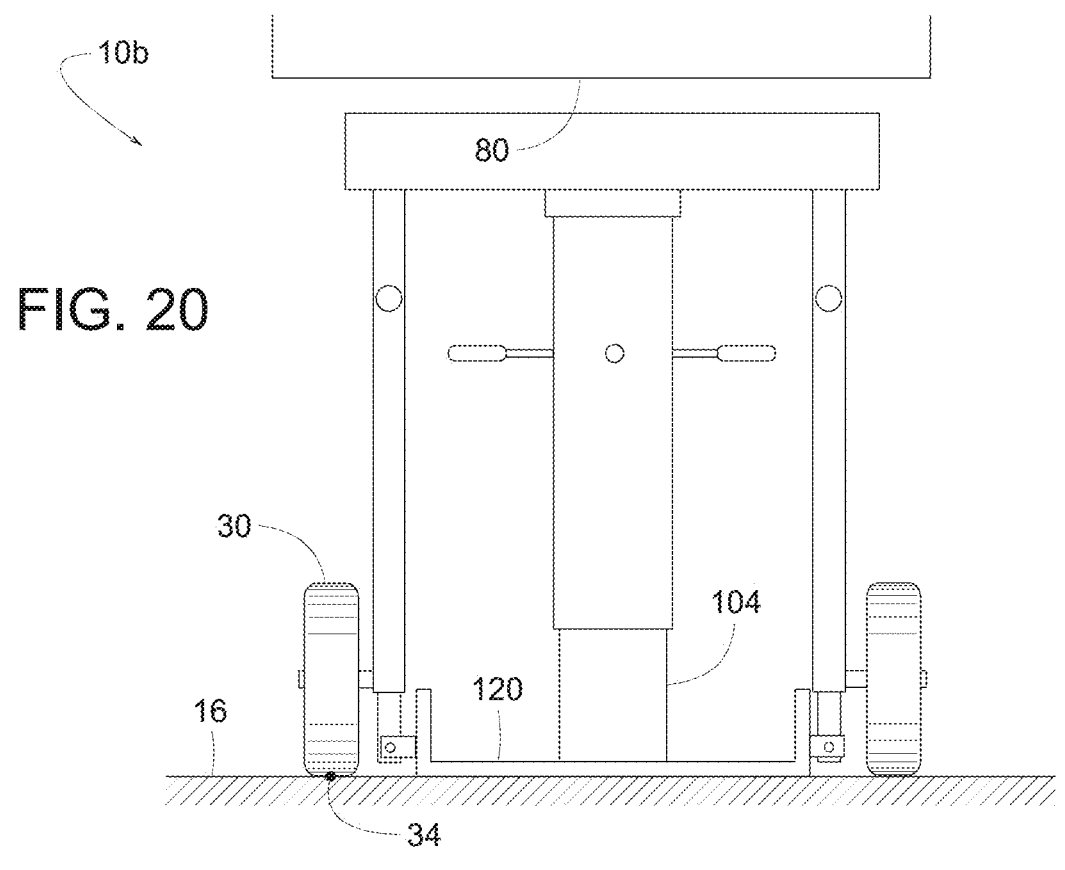
FIG. 20 is a front view similar to FIG. 17 but showing the example trailer stand in an operation mode.
Figure 21:
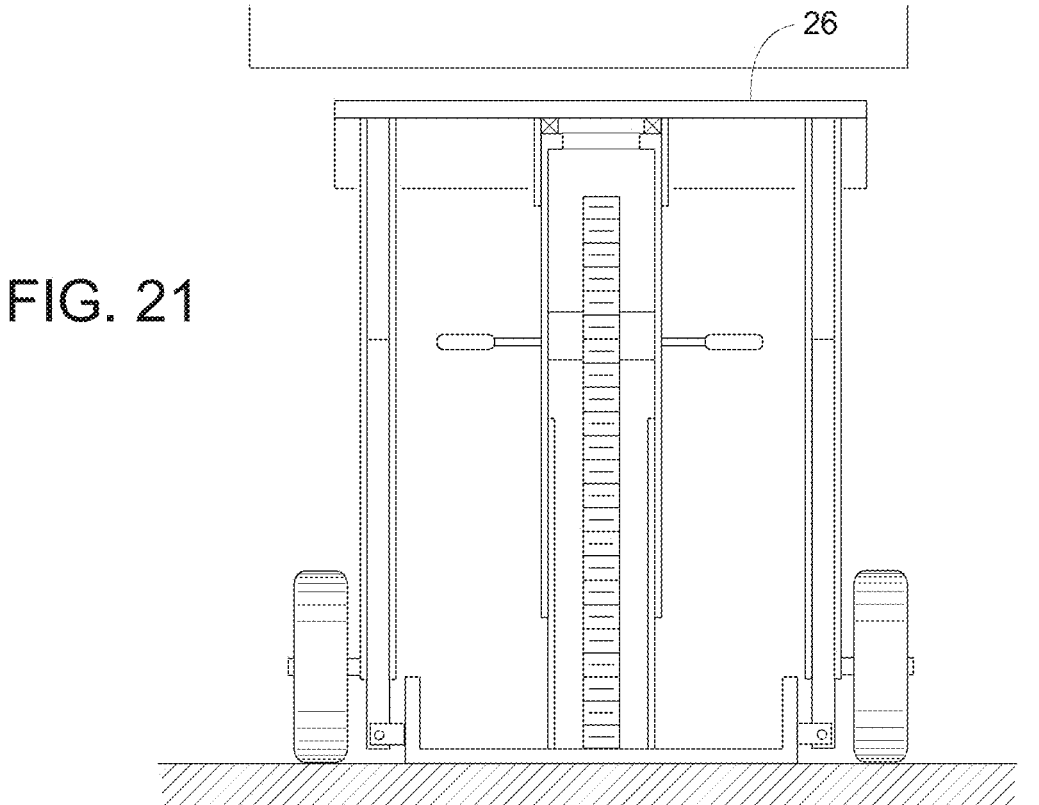
FIG. 21 shows the example trailer stand of FIG. 20 along a cross-sectional view similar to FIG. 19.

Some examples of trailer stand 10 have a tripod wheel arrangement 82, as shown in FIG. 14. More specifically, some examples of trailer stand 10 have three wheels 30 comprising right rear wheel 30b (a first wheel having a first lowermost point 34a), left rear wheel 30c (a second wheel having a second lowermost point 34b), and front wheel 30a (a third wheel having a third lowermost point 34c), the first lowermost point 34a and second lowermost point 34b defining a line 84 (e.g., on driveway 16), and third lowermost point 34c is horizontally spaced apart from line 84. Put another, in some examples, the front wheel 30a is positioned on a first side of a vertical plane 85 (FIGS. 6 and 14) along which the upper ledge 26 extends in the longitudinal direction 42, while the left and right rear wheels 30b, 30c are positioned on a second side of the vertical plane 85 opposite the front wheel 30a. Furthermore, as shown in the illustrated example of FIG. 14, the front wheel is positioned between a first line 86 extending perpendicular to the vertical plane 85 and passing through the right rear wheel 30b and a second line 87 extending perpendicular to the vertical plane 85 and passing through the left rear wheel 30c. In some examples, the front wheel 30a is positioned equidistant from the first and second lines 86, 87.

Wheels 30 contacting driveway 16 in a triangular pattern of three points 34a, 34b and 34c provides stability to trailer stand 10 during its repositioning in the transition mode. An open space 88 between two rear wheels 30b and 30c provide room for a walking operator's feet as the trailer stand 10 is moved in the transition mode. Open space 88 provides room to receive another trailer stand's front wheel 30a, so multiple trailer stands 10 can be stored in a compact nested arrangement, as shown in the right side of FIG. 14. In some examples, as shown in the illustrated example, all three of the wheels 30 are positioned between the first and second extendible legs 38a, 38b. That is, in some examples, the first and second extendible legs are positioned outside the space between the first and second lines 86, 87, shown in FIG. 14, with the first leg 38a positioned on an opposite side of the first line 86 than the front wheel 30a, and the second leg 38b is positioned on an opposite side of the second line 87 than the front wheel 30a.

In some examples, when wheels 30 are all pointed straight ahead to place trailer stand 10 in a straight travel configuration, as shown in FIG. 14, front wheel 30a is rotatable about a front axis 89, right rear wheel 30b is rotatable about a right axis 90, left rear wheel 30c is rotatable about a left axis 92, and all three axes 89, 90 and 92 are parallel to each other and substantially perpendicular to longitudinal axis direction 42. Right rear wheel 30b and left rear wheel 30c are spaced apart horizontally to provide open space 88 therebetween when trailer stand 10 is in the straight travel configuration. Open space 88 is wider than a front wheel width 94, higher than a front wheel height 96 (FIG. 8), and longer than a front wheel length 98. Consequently, front wheel 30*a* of one trailer stand 10 fits within open space 88 of another trailer stand 10, and so two or more trailer stands 10 can be stored in a nested arrangement, as shown in FIG. 14.

For greater maneuverability, some examples of trailer stand 10 have one or more wheels 30 that can swivel. In the example shown in FIG. 15, a first swivel mechanism 100 connects right rear wheel 30*b* to frame 36, a second swivel mechanism 100 connects left rear wheel 30*c* to frame 36, and an anti-swivel connection 102 couples front wheel 30*a* to frame 36. The term, "swivel mechanism" refers to any wheel-mounting structure that enables the wheel to rotate about an axis generally perpendicular to the axis about which the wheel rolls. The term, "anti-swivel connection" refers to any wheel-mounting structure that prevents the wheel from rotating about an axis generally perpendicular to the axis about which the wheel rolls. In the example shown in FIG. 15, rear wheels 30*b* and 30*c* can swivel but front wheel 30*a* cannot. In the example shown in FIG. 16, swivel mechanism 100 connects front wheel 30*a* to frame 36, and anti-swivel connections 102 couple rear wheels 30*b* and 30*c* to frame 36, front wheel 30*a* can swivel but rear wheels 30*b* and 30*c* cannot. In some examples, all three wheels 30*a*, 30*b* and 30*c* are mounted by way of a swivel mechanism. Alternatively or in addition, one or more of the wheels 30 can include a selective swivel enable/disable mechanism and/or brake to facilitate or prevent movement of the trailer stand in various directions.

Trailer stand 10*b*, shown in FIGS. 17-23, has just one extendible leg 104 and two wheels 30. In this example, trailer stand 10*b* comprises a frame 106 with upper ledge 26, two wheels 30 attached to two side members 108 of frame 106, two handles 110 extending from frame 106, a manually rotatable post 112, handles 114 for rotating post 112, a flange 116 coupling rotatable post 112 to frame 106, a thrust bearing 118 to handle the axial force between post 112 and frame 106, extendible leg 104 in telescopic relationship with post 112, a foot 120 attached to the bottom of leg 104, guide rods 122 attached to foot 120 and fitted in sliding relationship with side members 108, and a jackscrew 124 comprising a screw 126 threaded into a nut 128.

Figure 22:
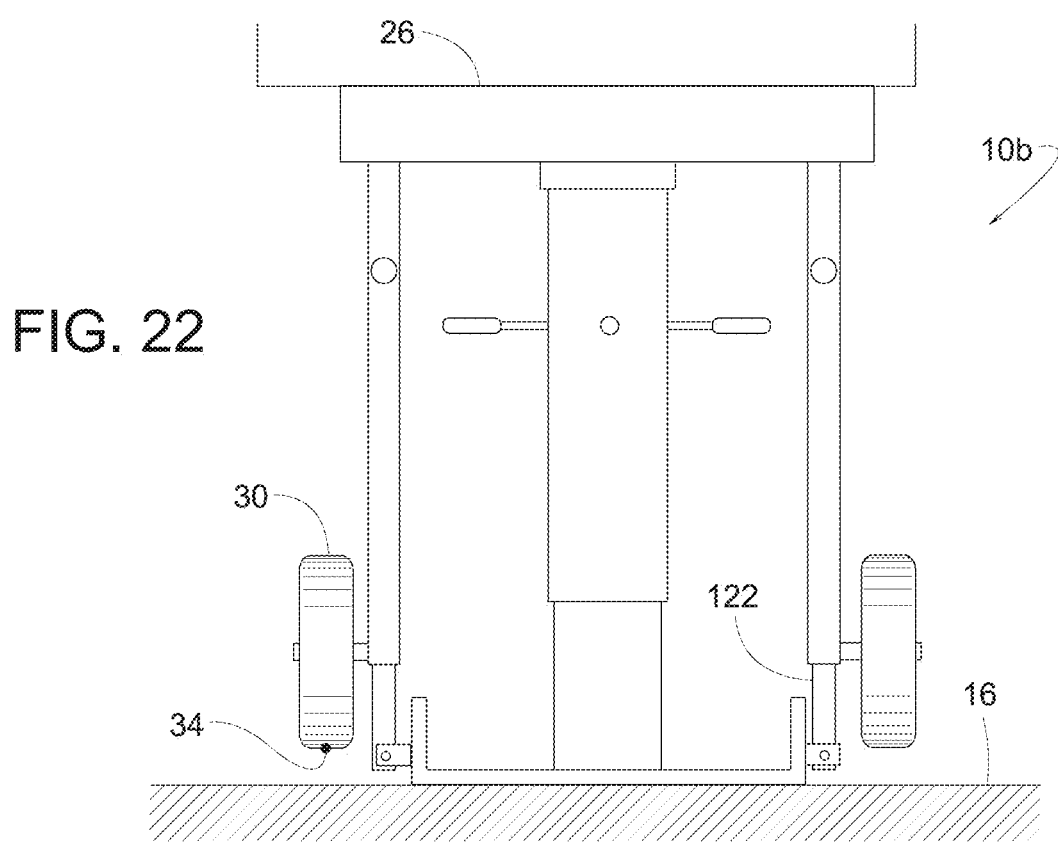
FIG. 22 is a front view similar to FIG. 17 but showing the example trailer stand in a bracing mode.
Figure 23:
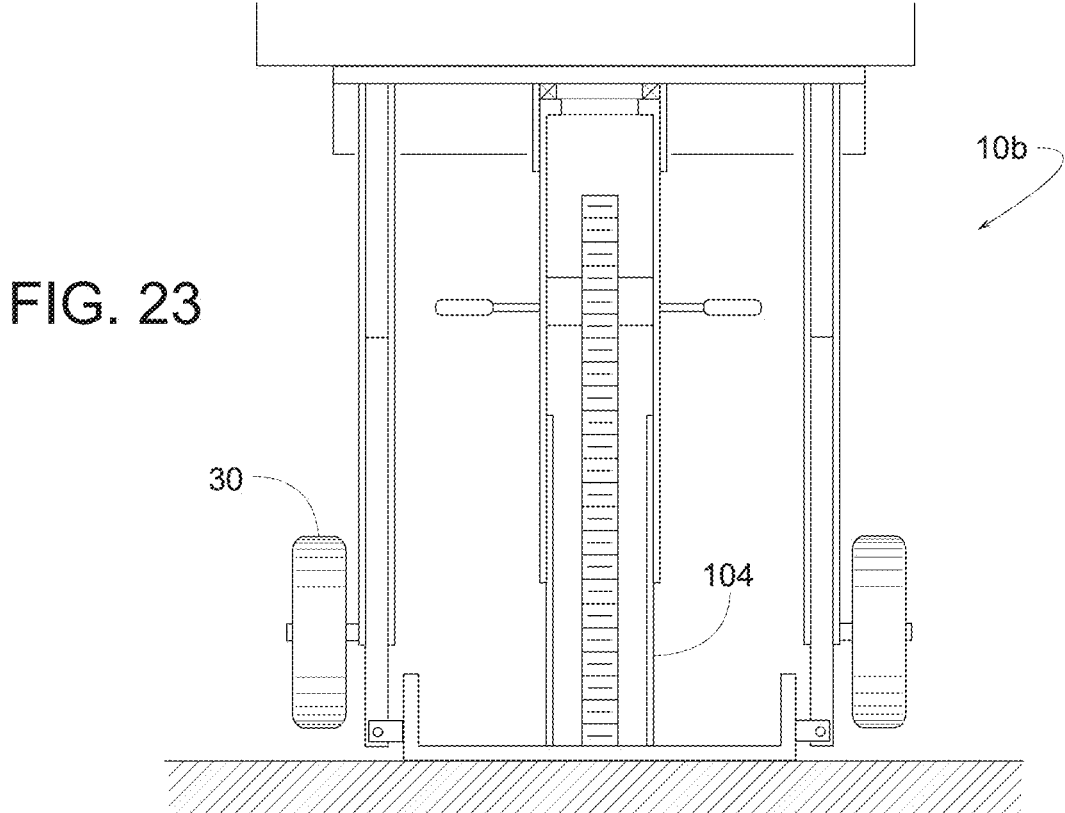
FIG. 23 shows the example trailer stand of FIG. 22 along a cross-sectional view similar to FIG. 19.

Nut 128 is welded or otherwise attached to post 112, and the bottom of screw 126 is fixed in relationship with foot 120 and leg 104. Rotating post 112 rotates nut 128 about screw 126, which extends or retracts leg 104 within post 112. Screw 126, foot 120 and guide rods 122 move in unison relative to wheels 30 and the frame's side members 108. So, using handles 114 for rotating post 112 selectively reconfigures trailer stand 10*b* to its transition mode (FIGS. 17, 18 and 19), operation mode (FIGS. 20 and 21), and its bracing mode (FIGS. 22 and 23).

FIGS. 24-28 show various example mechanical drive units for converting manual cranking to rotation of at least one jackscrew. The illustrated mechanical drive units are useable in the various example trailer stands disclosed herein.

Figure 24:
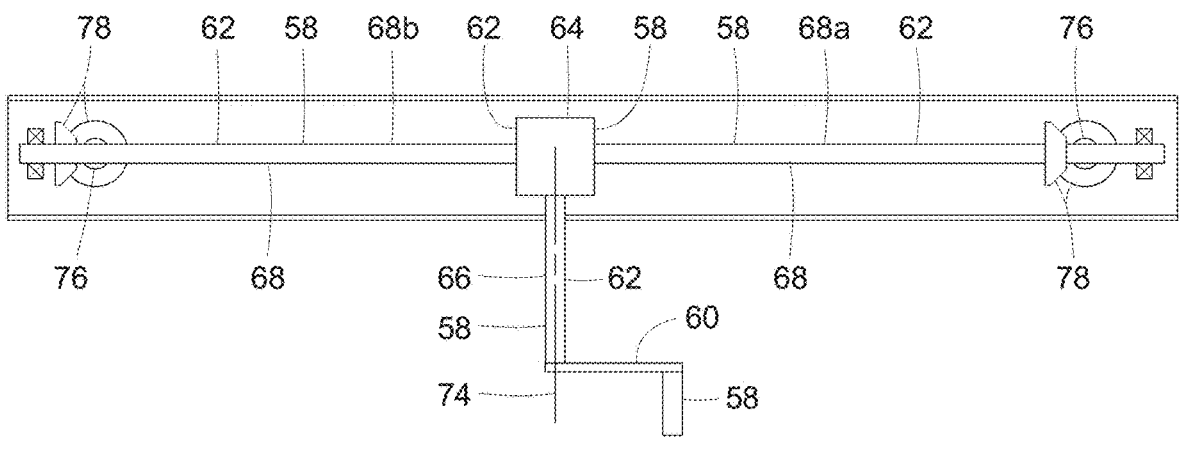
FIG. 24 is a cross-sectional view taken along line 24-24 of FIG. 5, showing an example mechanical drive unit of the example trailer stand of FIGS. 1-16.

In a first example, shown in FIG. 24, mechanical drive unit 58 comprises crank 60 and drive mechanism 62. In this example, drive mechanism 62 comprises crank shaft 66, gearbox 64, and two output shafts 68. Gearbox 64 delivers the rotation of crank shaft 66 to output shafts 68. Output shafts 68 drive bevel gears 78, which turn screws 76 of jackscrews 56. This particular example of mechanical drive unit 58 is also shown in FIGS. 9, 11 and 13.

Figure 25:
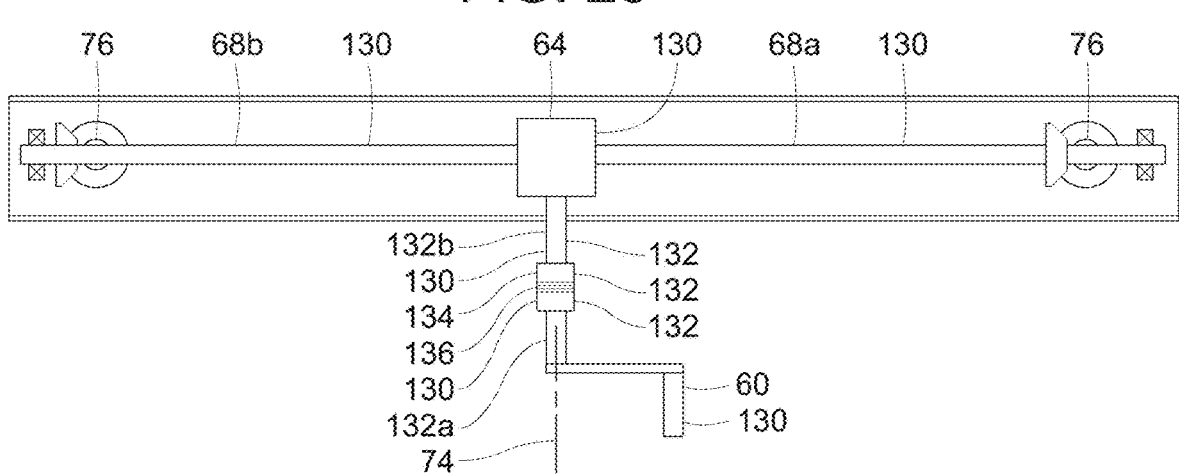
FIG. 25 is a cross-sectional view similar to FIG. 24 but showing another example mechanical drive unit.
Figure 26:
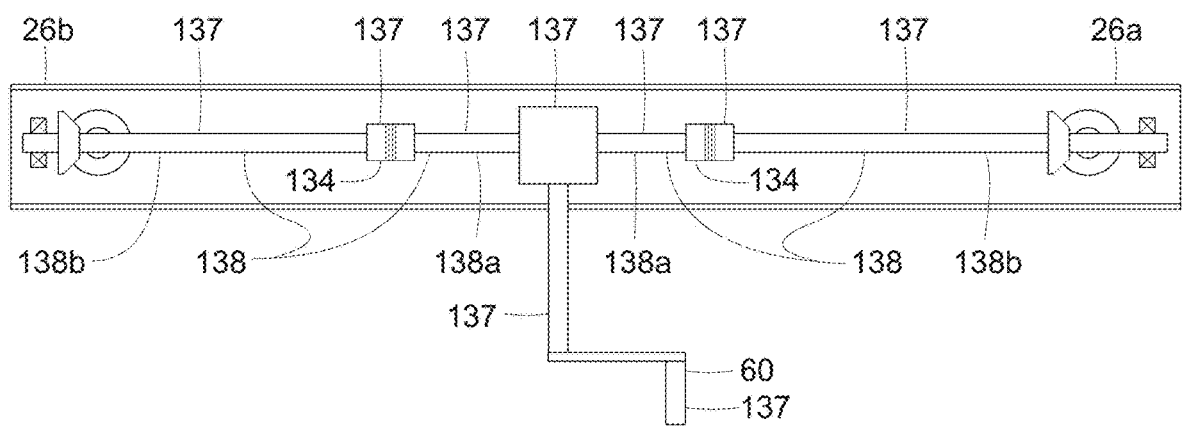
FIG. 26 is a cross-sectional view similar to FIG. 24 but showing another example mechanical drive unit.

A second example mechanical drive unit 130, shown in FIG. 25, is similar to drive unit 58 of FIG. 24; however, crank shaft 66 is replaced by an alternate crank shaft 132 comprising a slip clutch 134 coupling a first shaft segment 132*a* to a second shaft segment 132*b*. Slip clutch 134 includes frictional discs 136 that slip when subjected to a certain maximum allowable torque. This prevents crank 60 from delivering excessive torque to screws 76 and thus prevents trailer stand 10 from exerting excessive force up against the trailer's underside 80. Slippage of slip clutch 134 can also serve as a signal (e.g., a tactile, audible and/or visual indicator) to a dock worker that trailer stand 10 has reached its bracing mode. A third example mechanical drive unit 137, shown in FIG. 26, is similar to drive unit 130 of FIG. 24; however, each output shaft 68 is replaced by an alternate output shaft 138. In this example, each alternate output shaft 138 comprises slip clutch 134 coupling a first output shaft segment 138*a* to a second output shaft segment 138*b*. This arrangement is particularly useful when the trailer's underside 80 is not parallel to the trailer stand's upper ledge 26. So, when a first end 26*a* of upper ledge 26 engages the trailer's underside 80 before a second end 26*b* does so, the slip clutch 134 near first end 26*a* can slip while the slip clutch 134 near second end 26*b* allows the rotation of crank 60 to continue lifting second end 26*b* until second end 26*b* engages the trailer's underside 80.

Figure 27:
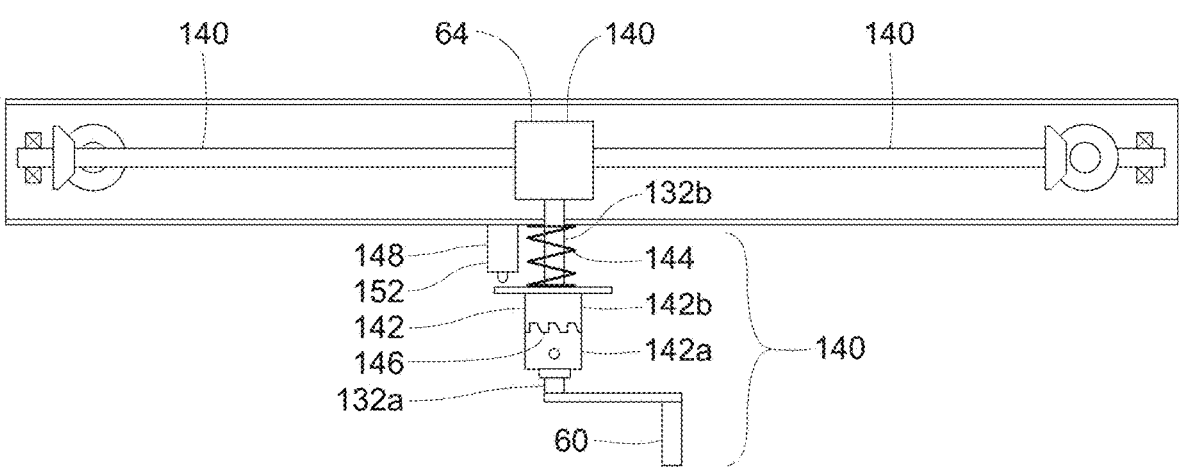
FIG. 27 is a cross-sectional view similar to FIG. 24 but showing another example mechanical drive unit.
Figure 28:
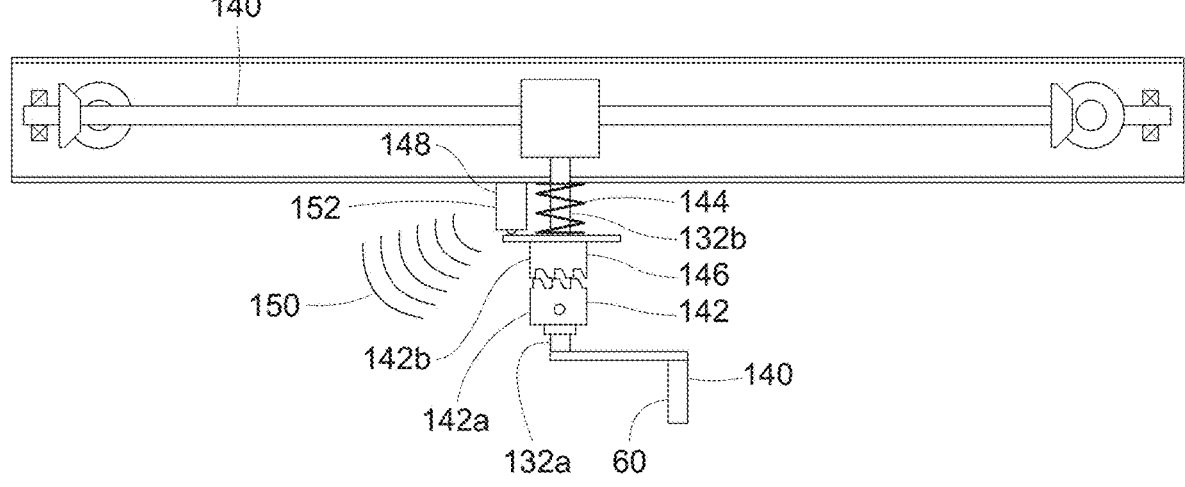
FIG. 28 is a cross-sectional view similar to FIG. 27 but showing the mechanical drive unit in a tripped configuration.

A fourth example mechanical drive unit 140, shown in FIGS. 27 and 28, is similar to drive unit 130 of FIG. 25; however, slip clutch 134 is replaced by an alternate slip clutch 142. In this example, slip clutch 142 comprises a compression spring 144 urging two axially toothed coupling halves 142*a* and 142*b* into meshing engagement with each other. Coupling half 142*a* is fixed relative to first shaft segment 132*a*. Coupling half 142*b* is rotationally fixed to second shaft segment 132*b* but can slide axially along second shaft segment 132*b*.

The engaging surfaces of the teeth 146 in slip clutch 142 are beveled or angled, so when crank 60 exerts sufficient torque characteristic of upper ledge 26 engaging the trailer's underside 80, the angled engagement urges coupling halves 142*a* and 142*b* axially apart to overcome the opposing axial force of spring 144. This axial movement can be seen by comparing FIGS. 27 and 28. FIG. 27 shows coupling halves 142*a* and 142*b* in full intermeshing engagement. FIG. 28 shows crank 60 having exerted sufficient torque to force coupling halves 142*a* and 142*b* apart. The slippage between coupling halves 142*a* and 142*b* can provide a signal (e.g., a tactile, audible and/or visual indicator) to a dock worker that trailer stand 10 has reached its bracing mode.

In some examples, mechanical drive unit 140 includes a sensor system 148 that provides an output signal 150 indicating whether trailer stand 10 is in the bracing mode. In the example shown in FIGS. 27 and 28, sensor system 148 comprises an energy-harvesting switch 152 that senses the axial movement of coupling half 142*b*. One example of switch 152 includes an AFIS Series Energy Harvesting Wireless Snap Switch provided by ZF Friedrichshafen AG of Friedrichshafen, Germany. Coupling half 142*b* moving axially from the position shown in FIG. 27 to that shown in FIG. 28 trips switch 152, which reacts by transmitting output signal 150. In some examples, output signal 150 is received by a suitable known electronic receiver. In response to receiving output signal 150, the receiver controls a light or some other visual and/or audible signal that informs a dockworker that trailer stand 10 is in the bracing mode.

Figure 29:
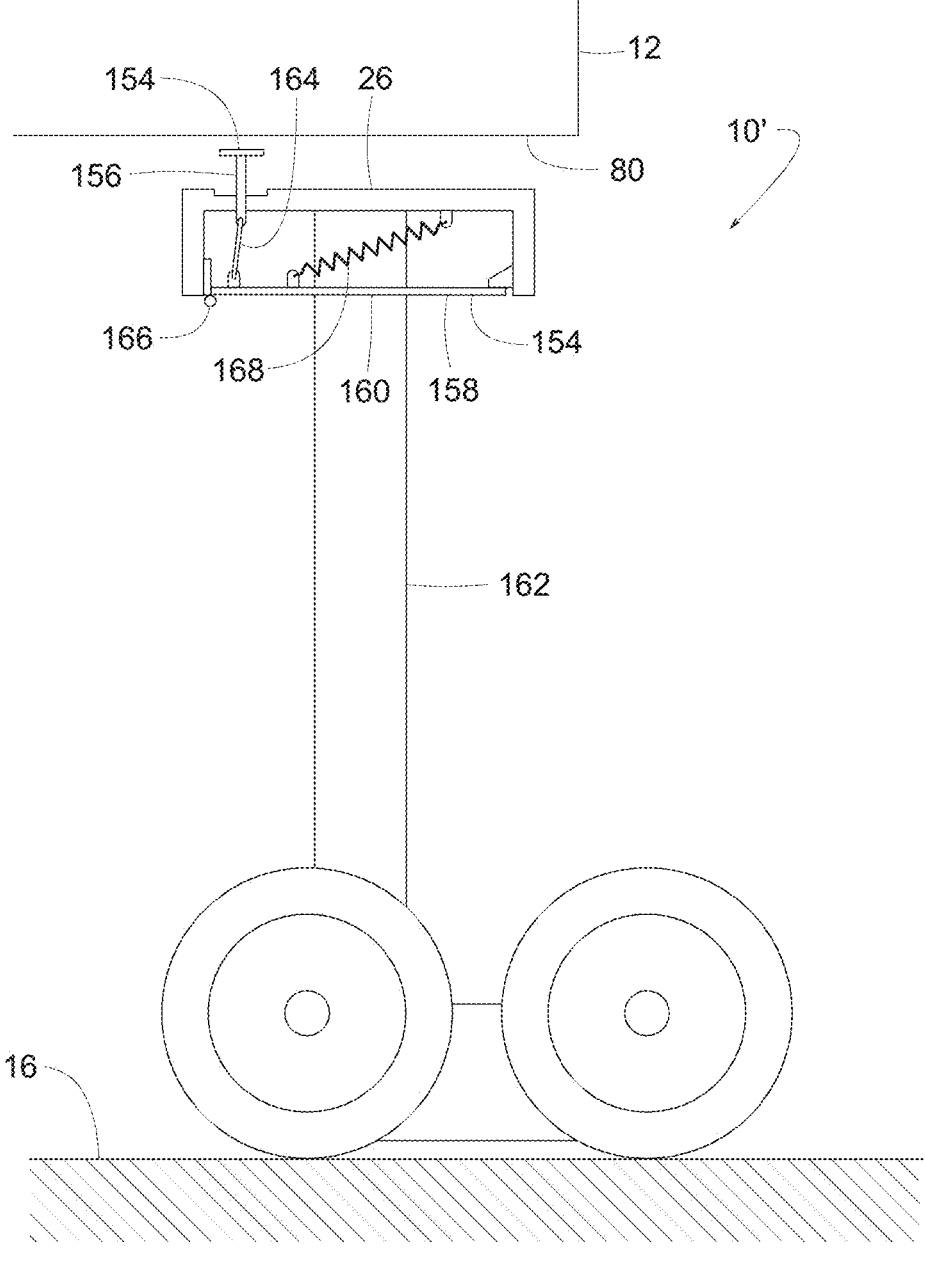
FIG. 29 is a side view of another example trailer in a transition mode.
Figure 30:
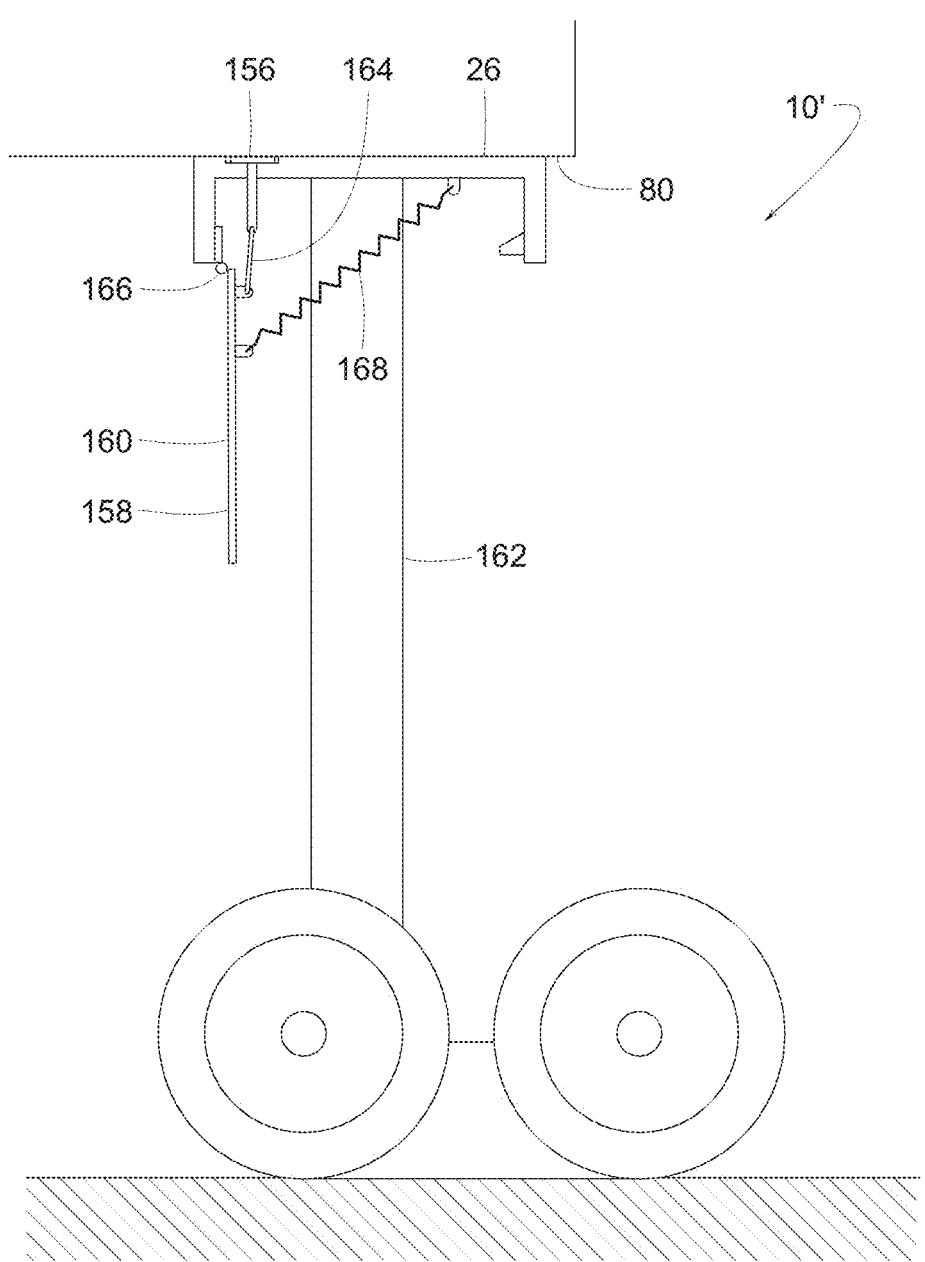
FIG. 30 is a side view similar to FIG. 29 but showing the example trailer stand in an operation mode.

FIGS. 29 and 30 show an example sensor system 154 for indicating whether a trailer stand 10' is in one of its operation and bracing modes. Trailer stand 10' is schematically illustrated to represent various trailer stands, including the ones disclosed herein. In the illustrated example, sensor system 154 comprises a trigger 156 and a visual indicator 158. In some examples, visual indicator 158 is a panel or a sign with a broad surface 160 facing selectively forward (more visually prominent) or facing downward (retracted position). Trigger 156 is movable selectively to a raised position (FIG. 29) and a lowered position (FIG. 30) relative to a frame 162 of trailer stand 10'. A link 164 connects trigger 156 to visual indicator 158, so visual indicator 158 is movable (e.g., pivotal or in translation) selectively to a retracted position (FIG. 29) and an extended position (e.g., a more visually prominent position) (FIG. 30) in response to trigger 156 moving between its raised position and its lowered position. In the illustrated example, a hinge 166 pivotally connects visual indicator 158 to frame 162, and an extension spring 168 urges visual indicator 158 to its retracted position and urges trigger 156 to its raised position.

Visual indicator 158 is in the retracted position when portable trailer stand 10' is in the transition mode, and trigger 156 is in the raised position. Visual indicator 158 is in the more visually prominent position (e.g., an extended position) when portable trailer stand 10' is in the operation mode, and trigger 156 is in the retracted position. Visual indicator 158 is in the more prominent position when portable trailer stand 10' is in the bracing mode and trigger 156 is in the lowered position.

Figure 31:
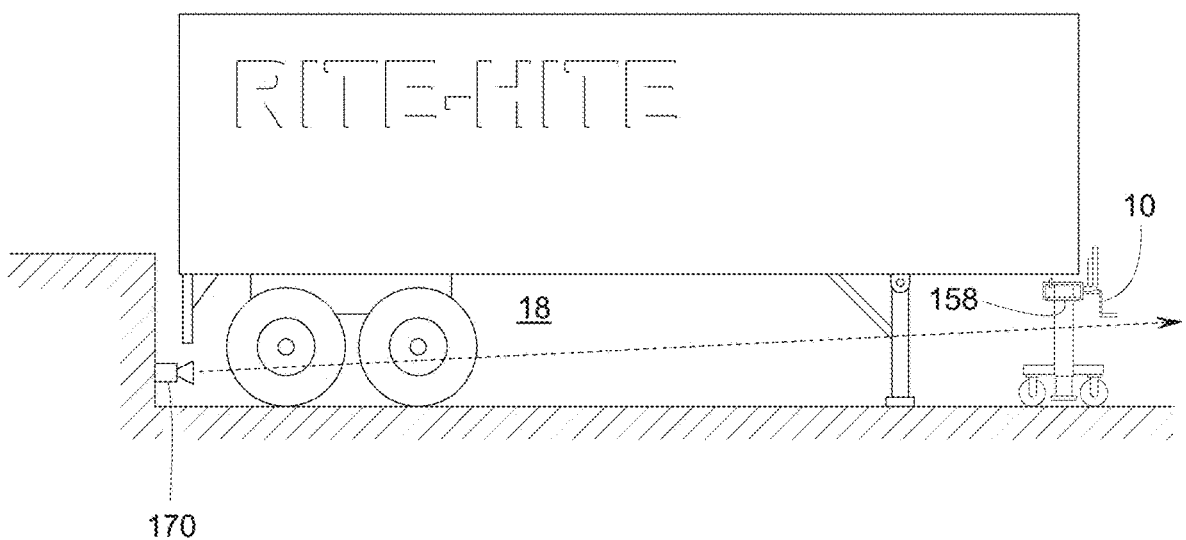
FIG. 31 is a side view similar to FIG. 3 but showing the example trailer stand of FIG. 29 in a transition mode.
Figure 32:
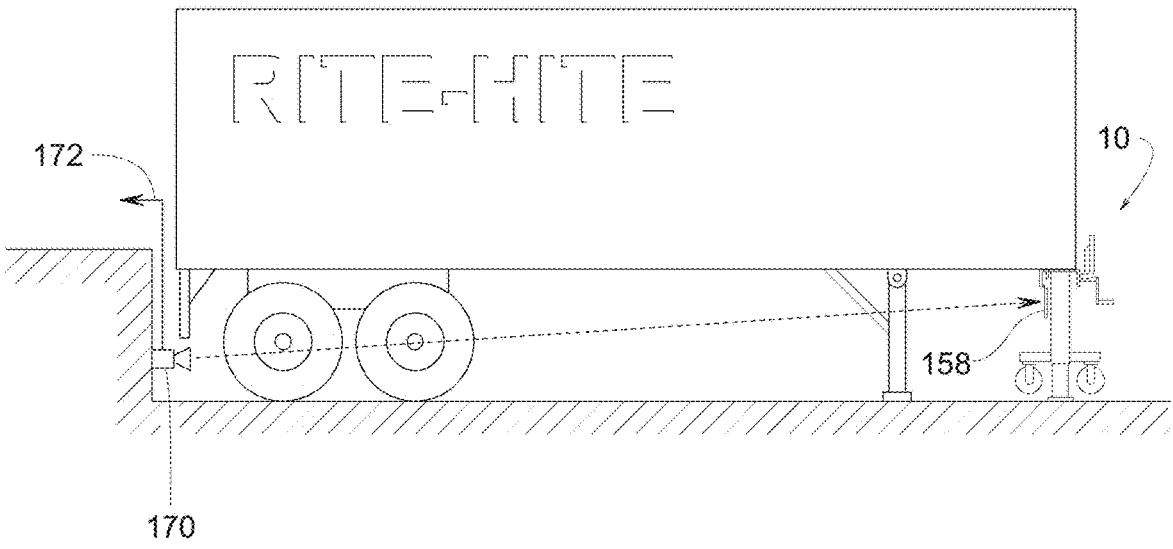
FIG. 32 is a side view similar to FIG. 4 but showing the example trailer stand of FIG. 29 in a bracing mode.

In the example shown in FIGS. 31 and 32, a camera system 170 installed at dock 18 is aimed toward an area where trailer stand 10 would most likely be used for stabilizing the front end of a trailer parked at dock 18. The term, "camera system" refers to a combination of a digital camera and a computer programmed to analyze images from the camera. With preprogrammed analytics, a signal 172 from camera system 170 indicates whether a trailer stand 10 is present and/or indicates in which mode trailer stand 10 is configured. This information can be useful for workers at dock 18. In some examples, camera system 170 distinguishes whether visual indicator 158 is in its retracted position (FIG. 31) or in its more prominent position (FIG. 32) and thus distinguishes whether trailer stand 10 is in a mode other than the operation or bracing mode.

Figure 33:
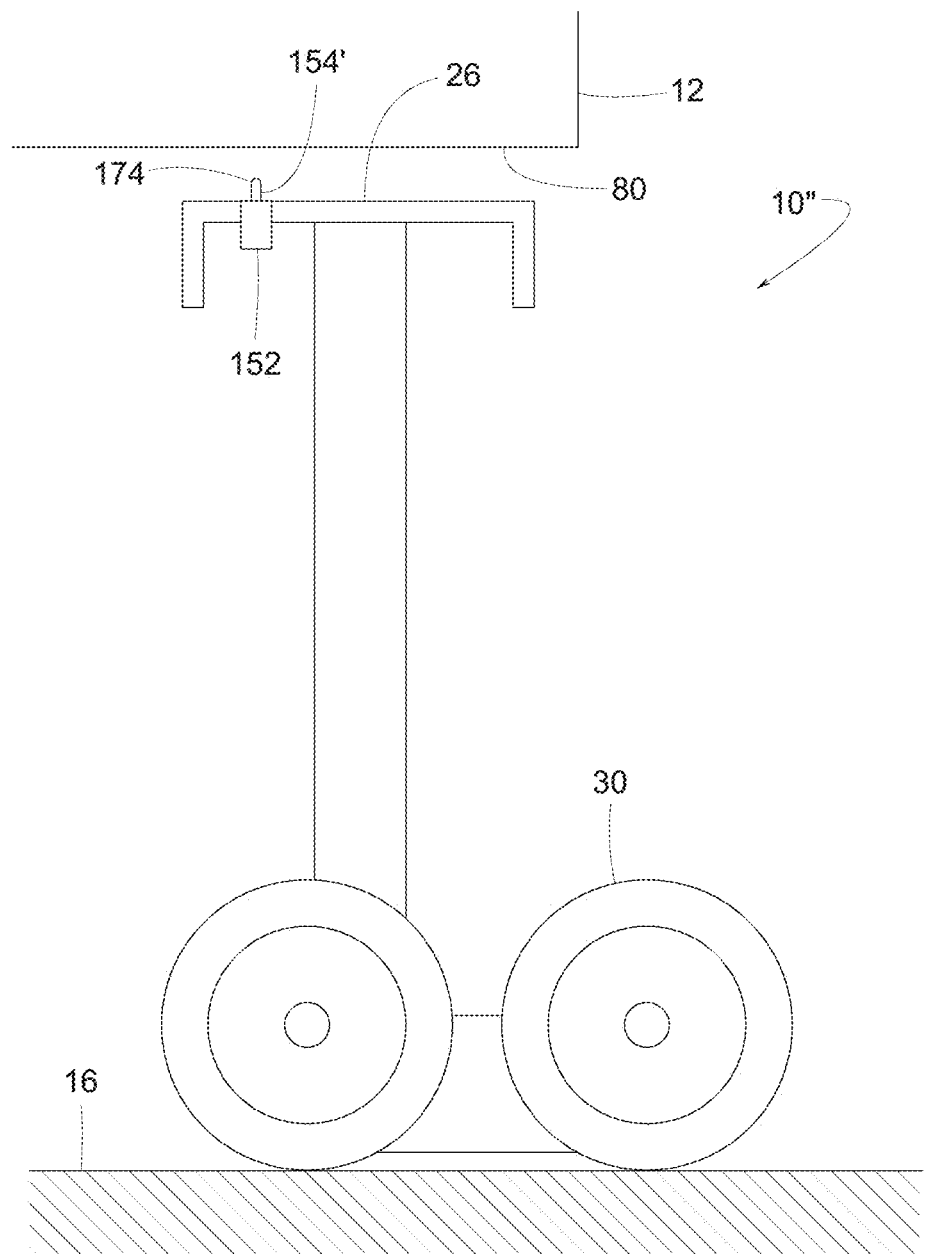
FIG. 33 is a side view similar to FIG. 29 but showing another example trailer stand in a transition mode.
Figure 34:
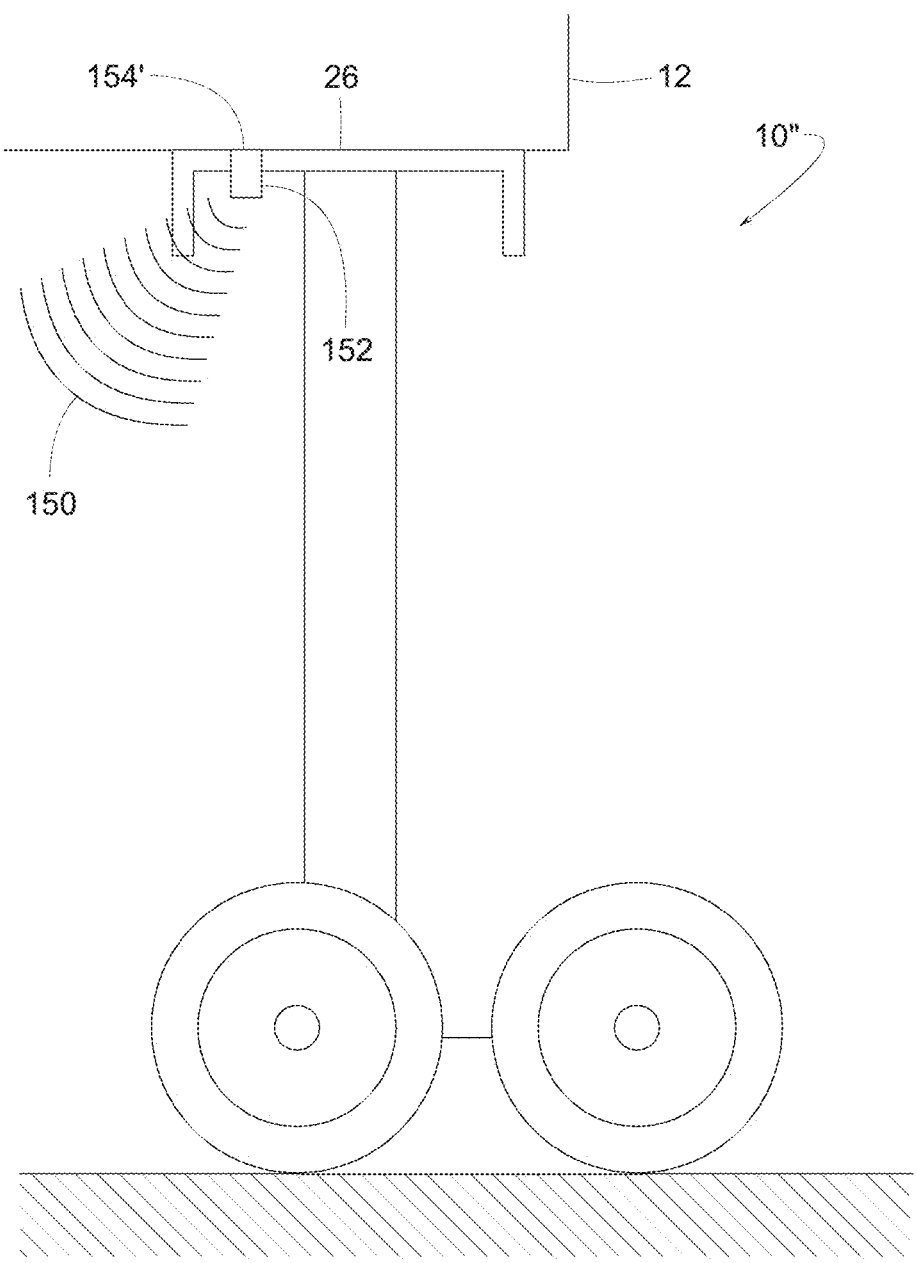
FIG. 34 is a side view similar to FIG. 33 but showing the trailer stand in a bracing mode.

In the example shown in FIGS. 33 and 34, energy-harvesting switch 152 serves as a sensor system 154', which can be used in an addition or as an alternative to the sensor systems shown in FIGS. 27-32. In the example of FIGS. 33 and 34, switch 152 has a trigger 174 protruding above upper ledge 26. In response to trigger 174 engaging the trailer's underside 80, switch 152 generates output signal 150. Output signal 150, which occurs when the trailer stand's upper ledge 26 engages trailer 12, indicates that trailer stand 10" is in either the operation mode or bracing mode, which can be useful information to dockworkers in the area of dock 18.

Figure 35:
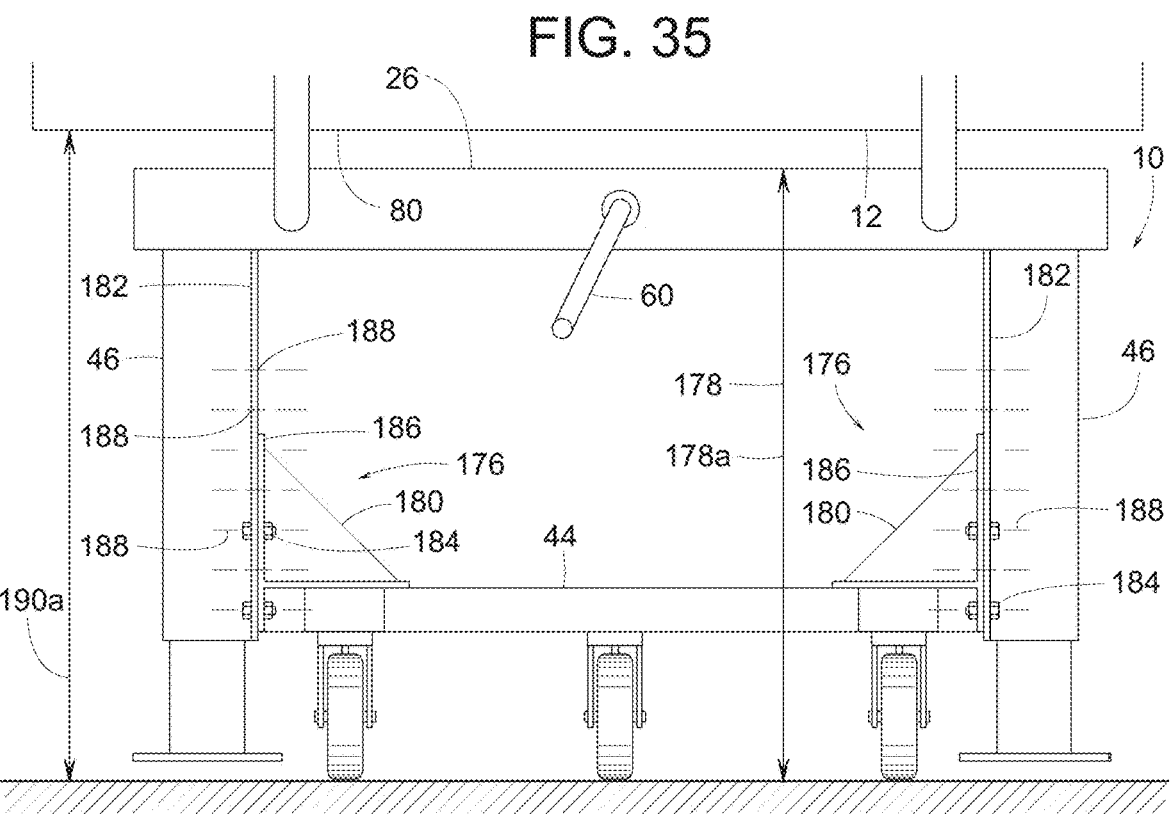
FIG. 35 is a side view similar to FIG. 8 but showing another example trailer stand in a taller configuration.
Figure 36:
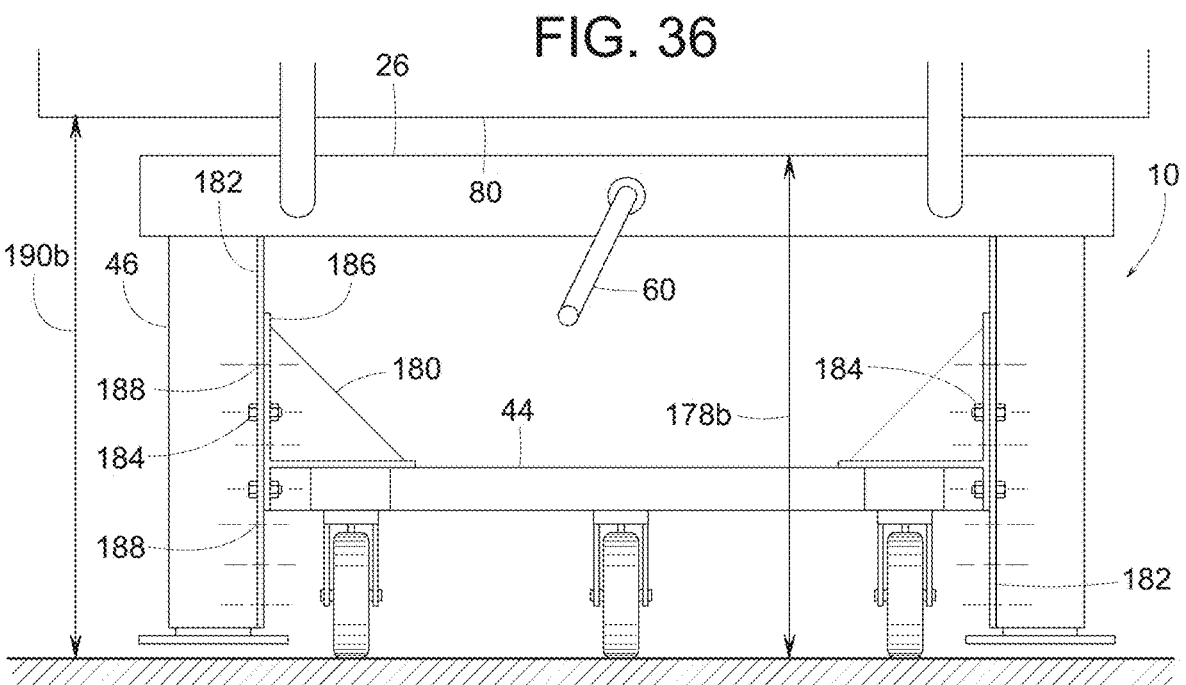
FIG. 36 is a side view of the example trailer stand shown in FIG. 35 in a shorter configuration.
Figure 37:
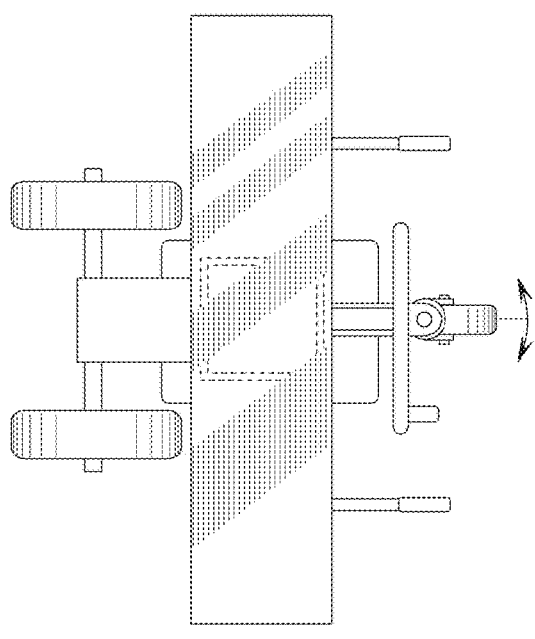
FIG. 37 is a top view of another example trailer stand.
Figure 38:
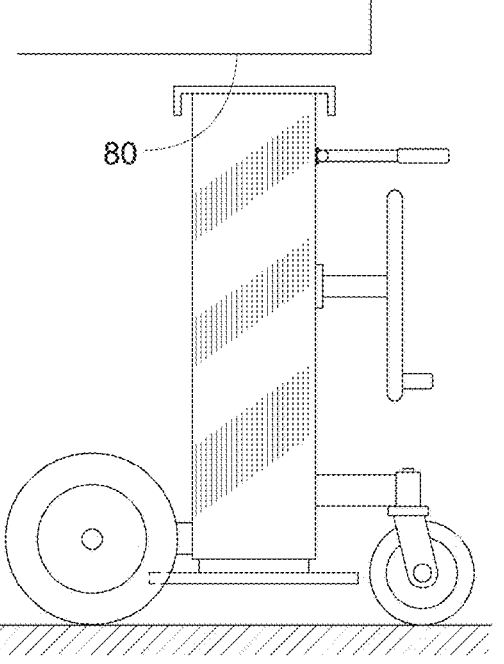
FIG. 38 is a side view of the example trailer stand shown in FIG. 37.
Figure 39:
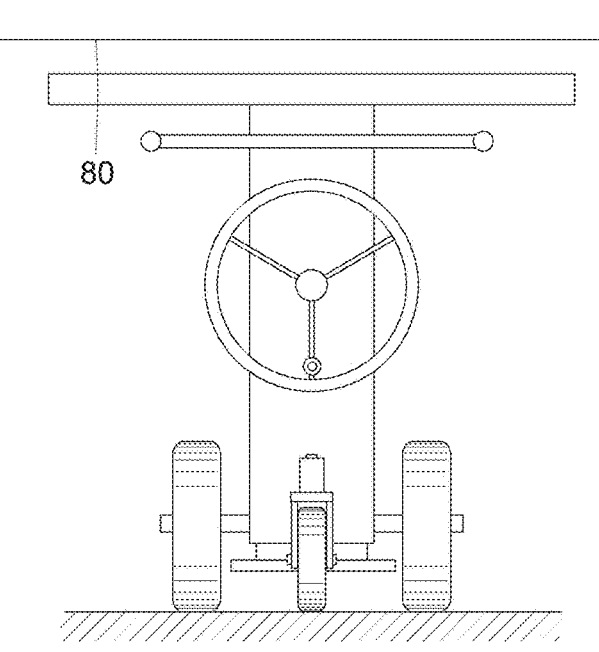
FIG. 39 is a front view of the example trailer stand shown in FIG.
Figure 40:
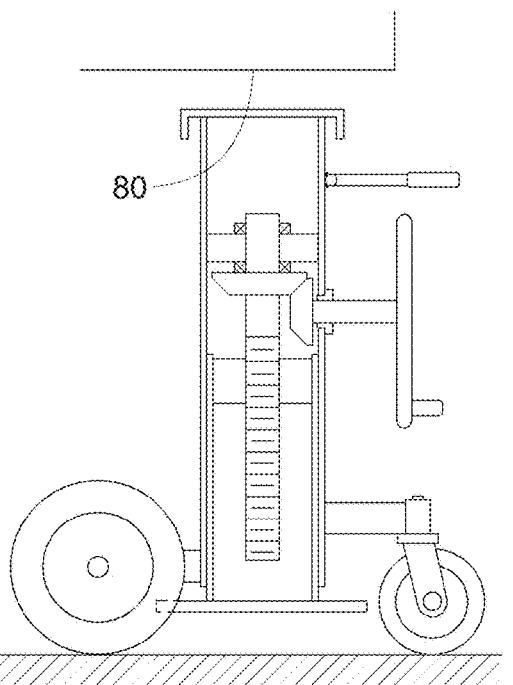
FIG. 40 is a cross-sectional side view of the example trailer stand of FIG. 37 shown in a transition mode.
Figure 41:
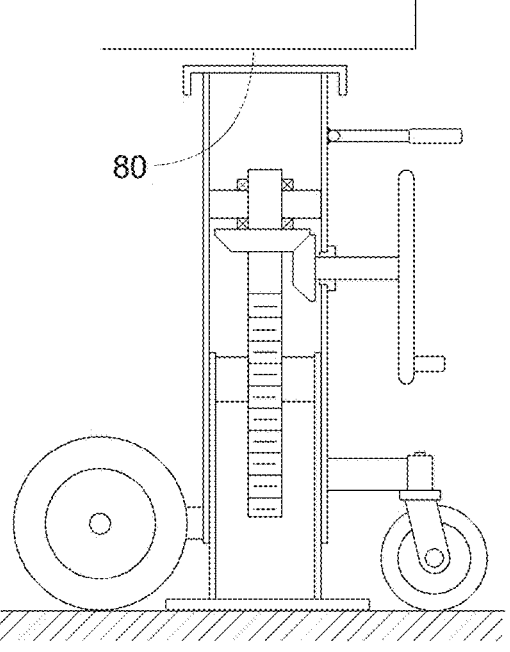
FIG. 41 is a cross-sectional side view of the example trailer stand of FIG. 37 shown in an operation mode.
Figure 42:
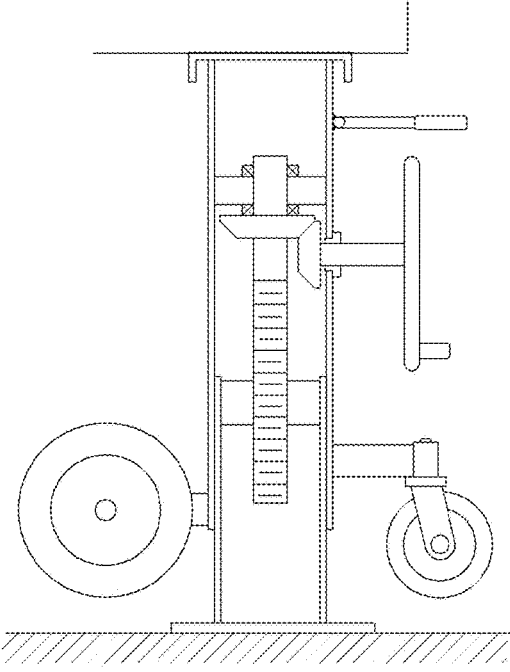
FIG. 42 is a cross-sectional side view of the example trailer stand of FIG. 37 shown in a bracing mode.
Figure 43:
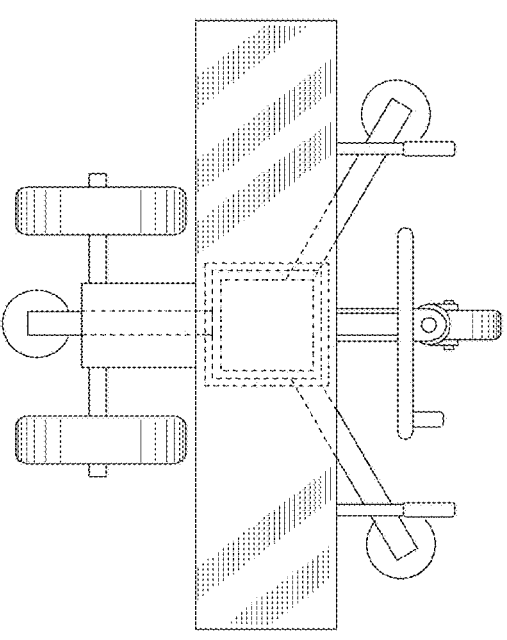
FIG. 43 is a top view of another example trailer stand similar to that of FIG. 37 with an alternative stand.
Figure 44:
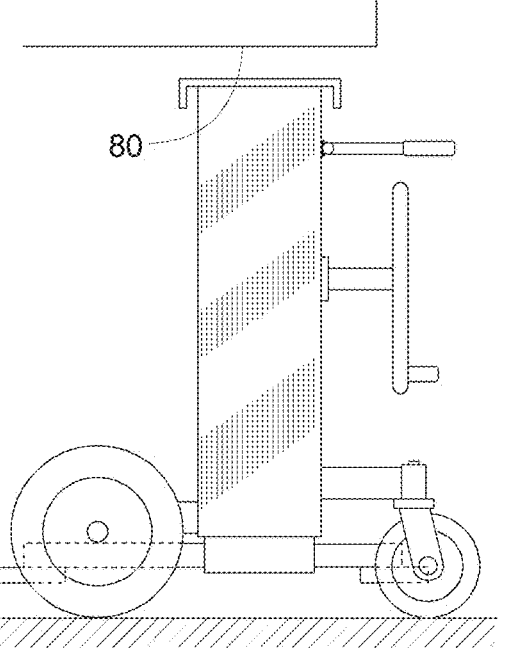
FIG. 44 is a side view of the example trailer stand shown in FIG. 43.
Figure 45:
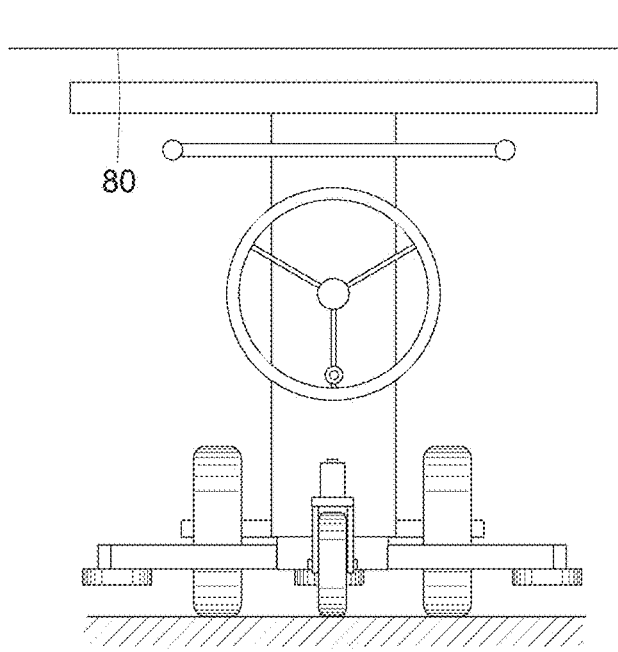
FIG. 45 is a front view of the example trailer stand shown in FIG. 43.
Figure 49:
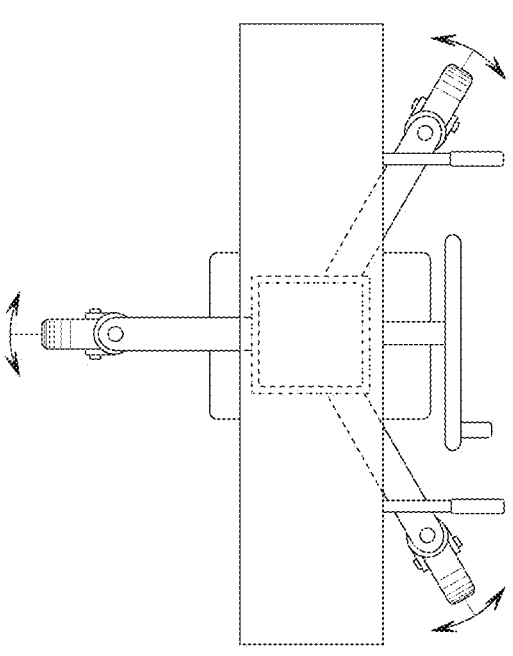
FIG. 49 is a top view of another example trailer stand similar to that of FIG. 37 with an alternative wheel arrangement.
Figure 50:
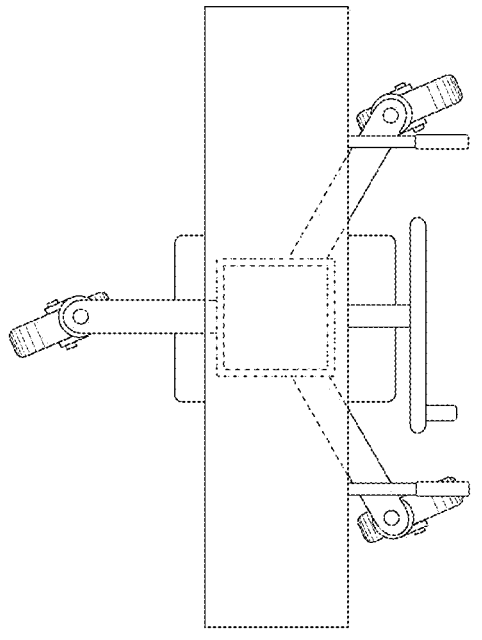
FIG. 50 is a top view of the example trailer stand of FIG. 49 showing the wheels swiveled in a direction

FIGS. 35 and 36 show an example mounting means 176 for adjustably connecting lower subframe 44 to posts 46. The adjustable connection between subframe 44 and posts 46 allows a height 178 of trailer stand 10 (in the transition mode) to be adjustably set so as to be just slightly lower than the underside 80 of a typical trailer 12 expected at a particular loading dock 18. This minimizes the amount of manual cranking needed to raise trailer stand 10 from its transition mode to its operation or bracing mode.

In the illustrated example, mounting means 176 comprises two gussets 180 welded or otherwise attached to subframe 44 and a mounting plate 182 welded or otherwise attached to each post 46. A fastener 184 (e.g., a bolt or a pin) removably connects a plate 186 on gusset 180 to plate 182 on post 46. In some examples, plates 182 and and/or 186 have a vertical series of holes 188 through which fasteners 184 can be inserted selectively to achieve various trailer stand heights (e.g., trailer stand heights 190*a* and 190*b*, wherein height 190*a* is greater than 190*b*).

FIG. 35, for example, shows fasteners 184 connecting subframe 44 near the bottom of post 46 to provide trailer stand 10 with a relatively tall height 178*a*. This works well for trailers having a rather high trailer height 190*a*. After trailer stand 10 is rolled in the transition mode underneath a relatively tall example of trailer 12, crank 60 is still used for raising trailer stand 10 to its operation or bracing mode, but the amount of cranking is reduced.

In the example shown in FIG. 36, fasteners 184 connect subframe 44 farther up on post 46 to provide trailer stand 10 with a relatively low height 178*b*. This works well for trailers having a rather low trailer height 190*b*. With trailer stand 10 in its transition mode at height 178*b*, crank 60 can still be used for raising trailer stand 10 to its operation or bracing mode.

FIGS. 37-42 illustrate another example trailer stand that includes a single extendible leg that is positioned within the area of a triangle defined by the three wheels supporting the trailer stand. FIGS. 43-48 illustrate another example trailer stand similar to the example trailer stand of FIGS. 37-42 except the base of the extendible leg includes multiple feet connected to the end of horizontally extending bars to widen the base when the extendible leg is supporting the trailer stand. In some examples, the bars extend beyond the area of the triangle defined by the three wheels on the trailer. In some example, the base of the extendible leg includes three bars (and three associated feet) arranged in a triangular formation with each bar extending different pairs of the wheels.

From the foregoing, it will be appreciated that example methods, apparatus and/or articles of manufacture have been disclosed that provide one or more benefits including being able to stabilize a trailer parked at a loading dock, being able to arrange multiple trailer stands in a compact nested arrangement, providing a trailer stand with three different configuration modes, providing a trailer stand with three wheels in a triangular pattern for broad support, and having a centrally located crank that drives the extension of two legs of a trailer stand.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B.

Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example maneuverable trailer stands are disclosed herein. Further examples and combinations thereof include the following:

Example 1 includes a portable trailer stand for stabilizing a trailer parked on a driveway, the trailer having an underside, the portable trailer stand comprising a frame having an upper ledge, the upper ledge being vertically movable to selectively engage and disengage the underside of the trailer, a first extendible leg being vertically movable relative to the frame, a first foot on the first extendible leg and moveable therewith to selectively engage and disengage the driveway, a front wheel connected to the frame, the front wheel being rotatable about a front axis, the front wheel having a front wheel length, a front wheel width and a front wheel height, the front wheel width being parallel to the front axis, the front wheel height extending vertically, and the front wheel length being perpendicular to the front wheel width and the front wheel height, a right rear wheel connected to the frame, the right rear wheel being rotatable about a right axis, and a left rear wheel connected to the frame, the left rear wheel being rotatable about a left axis, the portable trailer stand having selectively a straight travel configuration, the front axis being substantially parallel to both the right axis and the left axis when the portable trailer stand is in the straight travel configuration, the right rear wheel and the left rear wheel being spaced apart horizontally to provide an open space therebetween when the portable trailer stand is in the straight travel configuration, the open space being wider than the front wheel width, higher than the front wheel height and longer than the front wheel length.

Example 2 includes the portable trailer stand of example 1, wherein the front wheel, the right rear wheel and the left rear wheel remain at a substantially fixed elevation relative to the upper ledge regardless of vertical movement of the upper ledge, the first extendible leg and the first foot.

Example 3 includes the portable trailer stand of example 1, wherein the portable trailer stand has selectively a transition mode, an operation mode and a bracing mode, a bottom surface of the first foot being above a lowermost point of the right rear wheel in the transition mode, the bottom surface of the first foot being substantially level with the lowermost point of the right rear wheel in the operation mode, and the bottom surface of the first foot being below the lowermost point of the right rear wheel in the bracing mode.

Example 4 includes the portable trailer stand of example 1, wherein the upper ledge of the frame is elongate in a longitudinal direction, and the portable trailer stand further including a second extendible leg being vertically movable relative to the frame, a second foot on the second extendible leg and moveable therewith to selectively engage and disengage the driveway, a first jackscrew assembly inside the first extendible leg and being connected to selectively extend and retract the first extendible leg, a second jackscrew assembly inside the second extendible leg and being connected to selectively extend and retract the second extendible leg, a crank rotatable about a crank axis, the crank axis being displaced out of parallel alignment with the longitudinal direction, and a drive mechanism coupling the crank to both the first jackscrew assembly and the second jackscrew assembly such that rotation of the crank selectively raises and lowers both the first foot and the second foot relative to the frame, the right rear wheel and the left rear wheel.

Example 5 includes the portable trailer stand of example 4, wherein the crank axis is substantially perpendicular to the longitudinal direction.

Example 6 includes the portable trailer stand of example 4, wherein the crank axis is generally equidistant from the first extendible leg and the second extendible leg.

Example 7 includes the portable trailer stand of example 4, wherein the drive mechanism includes a first shaft and a second shaft, and the portable trailer stand further including a gearbox coupling the crank to both the first shaft and the second shaft, wherein the first shaft couples the gearbox to the first jackscrew assembly, and the second shaft couples the gearbox to the second jackscrew assembly.

Example 8 includes the portable trailer stand of example 7, further including a slip clutch coupling the crank to the gearbox.

Example 9 includes the portable trailer stand of example 7, further including a first slip clutch on the first shaft and a second slip clutch on the second shaft.

Example 10 includes the portable trailer stand of example 1, further including a handle attached to the frame and extending higher than the upper ledge of the frame, and a finger guard defining a hand-receiving space between the handle and the finger guard, the finger guard extending higher than the upper ledge of the frame, the finger guard being spaced a horizontal distance away from the upper ledge of the frame.

Example 11 includes the portable trailer stand of example 1, further including a swivel mechanism connecting at least one of the front wheel, the right rear wheel, or the left rear wheel to the frame.

Example 12 includes the portable trailer stand of example 1, further including an anti-swivel connection coupling the front wheel to the frame, a first swivel mechanism connecting the right rear wheel to the frame, and a second swivel mechanism connecting the left rear wheel to the frame.

Example 13 includes the portable trailer stand of example 3, further including a sensor system supported by at least one of the frame or the first extendible leg, the sensor system providing an output signal indicating whether the portable trailer stand is in one of the operation mode and the bracing mode.

Example 14 includes the portable trailer stand of example 13, wherein the sensor system includes a trigger and a visual indicator, the trigger being movable selectively to a raised position and a lowered position relative to the frame, the trigger in the raised position being higher than the upper ledge of the frame, the trigger being higher in the raised position than in the lowered position relative to the frame, the visual indicator being movable selectively to a retracted position and an extended position in response to the trigger moving between the raised position and the lowered position, the visual indicator being in the retracted position when the portable trailer stand is in the transition mode and the trigger is in the raised position, the visual indicator being in the extended position when the portable trailer stand is in the operation mode and the trigger is in the retracted position, and the visual indicator being in the extended position when the portable trailer stand is in the bracing mode and the trigger is in the lowered position.

Example 15 includes the portable trailer stand of example 13, further including a first jackscrew assembly connected to the first extendible leg, and a mechanical drive unit operatively coupled to the first jackscrew assembly to selectively raise and lower the first extendible leg, wherein the sensor system includes a slip clutch operatively coupled to the mechanical drive unit and an energy-harvesting switch operatively coupled to the slip clutch, the energy-harvesting switch electrically generating the output signal in response to a threshold slippage in the slip clutch.

Example 16 includes the portable trailer stand of example 14, wherein the visual indicator is pivotal between the retracted position and the extended position.

Example 17 includes the portable trailer stand of example 14, further including a camera system situated to detect whether the visual indicator is in the extended position.

Example 18 includes a portable trailer stand for stabilizing a trailer parked on a driveway, the trailer having an underside, the portable trailer stand comprising a frame having an upper ledge, the upper ledge being elongate in a longitudinal direction, the upper ledge being vertically movable to selectively engage and disengage the underside of the trailer, a first wheel connected to the frame, a first extendible leg being vertically moveable relative to the frame, a first foot on the first extendible leg and moveable therewith to selectively engage and disengage the driveway, a first jackscrew assembly inside the first extendible leg and being structured to selectively extend and retract the first extendible leg and thereby selectively lower and raise the first foot, a second extendible leg being vertically movable relative to the frame, a second foot on the second extendible leg and moveable therewith to selectively engage and disengage the driveway, a second jackscrew assembly inside the second extendible leg and being structured to selectively extend and retract the second extendible leg and thereby selectively lower and raise the second foot, a crank rotatable about a crank axis that is displaced out of parallel alignment with the longitudinal direction, and a drive mechanism coupling the crank to both the first jackscrew assembly and the second jackscrew assembly such that rotation of the crank selectively raises and lowers both the first foot and the second foot relative to the frame, the portable trailer stand having selectively a transition mode, an operation mode and a bracing mode, a bottom surface of the first foot and the second foot being above a lowermost point of the first wheel in the transition mode, the bottom surface being substantially level with the lowermost point of the first wheel in the operation mode, and the bottom surface being below the lowermost point of the first wheel in the bracing mode.

Example 19 includes the portable trailer stand of example 18, wherein the first wheel remains at a substantially fixed elevation relative to the upper ledge regardless of vertical movement of the upper ledge.

Example 20 includes the portable trailer stand of example 18, wherein the crank axis is substantially perpendicular to the longitudinal direction.

Example 21 includes the portable trailer stand of example 18, wherein the crank axis is substantially centrally located between the first extendible leg and the second extendible leg.

Example 22 includes the portable trailer stand of example 18, wherein the drive mechanism includes a first shaft and a second shaft, and the portable trailer stand further including a gearbox coupling the crank to both the first shaft and the second shaft, wherein the first shaft couples the gearbox to the first jackscrew assembly, and the second shaft couples the gearbox to the second jackscrew assembly.

Example 23 includes the portable trailer stand of example 22, further including a slip clutch coupling the crank to the gearbox.

Example 24 includes the portable trailer stand of example 22, further including a first slip clutch on the first shaft and a second slip clutch on the second shaft.

Example 25 includes the portable trailer stand of example 18, further including a handle attached to the frame and extending higher than the upper ledge of the frame, and a finger guard defining a hand-receiving space between the handle and the finger guard, the finger guard extending higher than the upper ledge of the frame, the finger guard being spaced a certain horizontal distance away from the upper ledge of the frame.

Example 26 includes the portable trailer stand of example 18, further including a second wheel, an anti-swivel connection coupling the second wheel to the frame, a third wheel, and a swivel mechanism coupling the third wheel to the frame.

Example 27 includes the portable trailer stand of example 18, further including a sensor system supported by at least one of the frame or the first extendible leg, the sensor system providing an output signal indicating whether the portable trailer stand is in one of the operation mode and the bracing mode.

Example 28 includes the portable trailer stand of example 27, wherein the sensor system includes a trigger and a visual indicator, the trigger being movable selectively to a raised position and a lowered position relative to the frame, the trigger in the raised position being higher than the upper ledge of the frame, the trigger being higher in the raised position than in the lowered position relative to the frame, the visual indicator being movable selectively to a retracted position and an extended position in response to the trigger moving between the raised position and the lowered position, the visual indicator being in the retracted position when the portable trailer stand is in the transition mode and the trigger is in the raised position, the visual indicator being in the extended position when the portable trailer stand is in the operation mode and the trigger is in the retracted position, and the visual indicator being in the extended position when the portable trailer stand is in the bracing mode and the trigger is in the lowered position.

Example 29 includes the portable trailer stand of example 28, wherein the visual indicator is pivotal between the retracted position and the extended position.

Example 30 includes the portable trailer stand of example 28, further including a camera system situated to detect whether the visual indicator is in the extended position.

Example 31 includes a portable trailer stand for stabilizing a trailer parked on a driveway, the trailer having an underside, the portable trailer stand comprising a frame having an upper ledge, the upper ledge being vertically movable to selectively engage and disengage the underside of the trailer, a first extendible leg being vertically movable relative to the frame, a first foot on the first extendible leg and moveable therewith to selectively engage and disengage the driveway, and three wheels connected to the frame and supporting substantially an entire combined weight of the frame, the first extendible leg and the first foot when the upper ledge is disengaged from the underside of the trailer, the first foot is disengaged from the driveway, and the three wheels are resting upon the driveway, the three wheels comprise a first wheel having a first lowermost point, a second wheel having a second lowermost point, and a third wheel having a third lowermost point, the first lowermost point and the second lowermost point defining a line, and the third lowermost point being horizontally spaced apart from the line.

Example 32 includes the portable trailer stand of example 31, wherein the three wheels remain at a substantially fixed distance from the upper ledge regardless of vertical movement of the upper ledge and regardless of extension of the first extendible leg.

Example 33 includes the portable trailer stand of example 31, wherein the portable trailer stand has selectively a transition mode, an operation mode and a bracing mode, a bottom surface of the first foot being above a first lowermost point of the first wheel in the transition mode, the bottom surface of the first foot being substantially level with the first lowermost point of the first wheel in the operation mode, and the bottom surface of the first foot being below the first lowermost point of the first wheel in the bracing mode.

Example 34 includes the portable trailer stand of example 31, wherein the upper ledge of the frame is elongate in a longitudinal direction, and the portable trailer stand further including a second extendible leg being vertically movable relative to the frame, a second foot on the second extendible leg and moveable therewith to selectively engage and disengage the driveway, a first jackscrew assembly inside the first extendible leg and being structure to selectively extend and retract the first extendible leg and thereby selectively lower and raise the first foot, a second jackscrew assembly inside the second extendible leg and being structured to selectively extend and retract the second extendible leg and thereby selectively lower and raise the second foot, a crank rotatable about a crank axis, the crank axis being displaced out of parallel alignment with the longitudinal direction, and a drive mechanism coupling the crank to both the first jackscrew assembly and the second jackscrew assembly such that rotation of the crank selectively raises and lowers both the first foot and the second foot relative to the frame and the three wheels.

Example 35 includes the portable trailer stand of example 34, wherein the crank axis is substantially perpendicular to the longitudinal direction.

Example 36 includes the portable trailer stand of example 34, wherein the crank is substantially centrally located between the first extendible leg and the second extendible leg.

Example 37 includes the portable trailer stand of example 34, wherein the drive mechanism includes a first shaft and a second shaft, and the portable trailer stand further including a gearbox coupling the crank to both the first shaft and the second shaft, wherein the first shaft couples the gearbox to the first jackscrew assembly, and the second shaft couples the gearbox to the second jackscrew assembly.

Example 38 includes the portable trailer stand of example 37, further including a slip clutch coupling the crank to the gearbox.

Example 39 includes the portable trailer stand of example 37, further including a first slip clutch on the first shaft and a second slip clutch on the second shaft.

Example 40 includes the portable trailer stand of example 31, further including a handle attached to the frame and extending higher than the upper ledge of the frame, and a finger guard defining a hand-receiving space between the handle and the finger guard, the finger guard extending higher than the upper ledge of the frame, the finger guard being spaced a certain horizontal distance away from the upper ledge of the frame.

Example 41 includes the portable trailer stand of example 31, further including a first swivel mechanism connecting the first wheel to the frame, and an anti-swivel connection coupling the third wheel to the frame.

Example 42 includes the portable trailer stand of example 33, further including a sensor system supported by at least one of the frame or the first extendible leg, the sensor system providing an output signal indicating whether the portable trailer stand is in one of the operation mode and the bracing mode.

Example 43 includes the portable trailer stand of example 42, wherein the sensor system includes a trigger and a visual indicator, the trigger being movable selectively to a raised position and a lowered position relative to the frame, the trigger in the raised position being higher than the upper ledge of the frame, the trigger being higher in the raised position than in the lowered position relative to the frame, the visual indicator being movable selectively to a retracted position and an extended position in response to the trigger moving between the raised position and the lowered position, the visual indicator being in the retracted position when the portable trailer stand is in the transition mode and the trigger is in the raised position, the visual indicator being in the extended position when the portable trailer stand is in the operation mode and the trigger is in the retracted position, and the visual indicator being in the extended position when the portable trailer stand is in the bracing mode and the trigger is in the lowered position.

Example 44 includes the portable trailer stand of example 42, further including a first jackscrew assembly connected to the first extendible leg, and a mechanical drive unit operatively coupled to the first jackscrew assembly to selectively raise and lower the first extendible leg, wherein the sensor system includes a slip clutch operatively coupled to the mechanical drive unit and an energy-harvesting switch operatively coupled to the slip clutch, the energy-harvesting switch electrically generating the output signal in response to a threshold slippage in the slip clutch.

Example 45 includes the portable trailer stand of example 43, wherein the visual indicator is pivotal between the retracted position and the extended position.

Example 46 includes the portable trailer stand of example 43, further including a camera system situated to detect whether the visual indicator is in the extended position.

Example 47 includes a portable trailer stand for stabilizing a trailer parked on a driveway, the trailer having an underside, the portable trailer stand comprising a frame having an upper ledge that is elongate in a longitudinal direction, the upper ledge being vertically movable to selectively engage and disengage the underside of the trailer, a plurality of wheels coupled to the frame, a first leg coupled to the frame and being extendible along a first leg axis, a first jackscrew inside the first leg, a second leg coupled to the frame and being extendible along a second leg axis, a second jackscrew inside the second leg, a crank rotatable about a crank axis, the crank axis being displaced out of parallel alignment with the longitudinal direction, the crank axis being interposed between the first leg axis and the second leg axis, and a drive mechanism coupling rotation of the crank to simultaneous rotation of both the first jackscrew and the second jackscrew.

Example 48 includes the portable trailer stand of example 47, wherein the plurality of wheels remain at a substantially fixed elevation relative to the upper ledge regardless of vertical movement of the upper ledge.

Example 49 includes the portable trailer stand of example 47, wherein the crank axis is substantially perpendicular to the longitudinal direction.

Example 50 includes the portable trailer stand of example 47, wherein the crank axis is generally equidistant from the first leg and the second leg.

Example 51 includes the portable trailer stand of example 47, wherein the drive mechanism includes a first shaft and a second shaft, and the portable trailer stand further including a gearbox coupling the crank to both the first shaft and the second shaft, wherein the first shaft couples the gearbox to the first jackscrew, and the second shaft couples the gearbox to the second jackscrew.

Example 52 includes the portable trailer stand of example 51, further including a slip clutch coupling the crank to the gearbox.

Example 53 includes the portable trailer stand of example 51, further including a first slip clutch on the first shaft and a second slip clutch on the second shaft.

Example 54 includes the portable trailer stand of example 47, further including a handle attached to the frame and extending higher than the upper ledge of the frame, and a finger guard defining a hand-receiving space between the handle and the finger guard, the finger guard extending higher than the upper ledge of the frame, the finger guard being spaced a horizontal distance away from the upper ledge of the frame.

Example 55 includes a portable trailer stand, comprising, a frame having an upper ledge, an extendible leg coupled to the frame, the upper ledge being vertically movable to selectively engage and disengage an underside of a trailer parked on a driveway based on movement of the extendible leg relative to the frame, and a wheel connected to the frame, the wheel to remain at a substantially fixed distance from the upper ledge as the upper ledge is vertically moved.

Example 56 includes the portable trailer stand of example 55, further including a foot connected to a base of the extendible leg, the foot to selectively move a first distance from the upper ledge and a second distance from the upper ledge, the first distance being closer to the upper ledge than a lowermost point on the wheel, the second distance being farther from the upper ledge than the lowermost point on the wheel.

Example 57 includes the portable trailer stand of example 55, wherein the frame includes a post and a lower subframe, the lower subframe connected to the upper ledge via the post, the wheel connected to the frame via the lower subframe, the lower subframe selectively mountable to the post at different heights to selectively adjust the substantially fixed distance between the wheel and the upper ledge.

Example 58 includes the portable trailer stand of example 55, wherein the wheel is a first wheel, the upper ledge being elongate in a longitudinal direction along a vertical plane, the portable trailer stand further including a second wheel connected to the frame, and a third wheel connected to the frame, the first wheel positioned on a first side of the vertical plane, the second and third wheels positioned on a second side of the vertical plane opposite the first side, the second wheel spaced apart from the third wheel in a direction extending parallel to the vertical plane.

Example 59 includes the portable trailer stand of example 58, wherein the first wheel is positioned between (1) a first line extending perpendicular to the vertical plane and passing through the second wheel and (2) a second line extending perpendicular to the vertical plane and passing through the third wheel.

Example 60 includes the portable trailer stand of example 59, where the first wheel is positioned equidistant from the first and second lines.

Example 61 includes the portable trailer stand of example 59, wherein the extendible leg is a first extendible leg, the portable trailer stand further including a second extendible leg, the first leg positioned on an opposite side of the first line than the first wheel, the second leg positioned on an opposite side of the second line than the first wheel.

Example 62 includes the portable trailer stand of example 58, wherein the first and second wheels are spaced substantially a same distance from the vertical plane.

Example 63 includes the portable trailer stand of example 58, further including a first handle attached to the frame, and a second handle attached to the frame, the second handle spaced apart from the first handle in a direction extending parallel to the vertical plane, the first and second handles offset relative to the upper ledge, both the first and second handles positioned on the same side of the vertical plane.

Example 64 includes the portable trailer stand of example 55, further including a handle attached to the frame, the handle extending higher than the upper ledge at a first location horizontally offset relative to upper ledge, and a finger guard attached to the frame adjacent the handle, the finger guard extending higher than the upper ledge at a second location horizontally offset relative to upper ledge, the first location being offset farther from the upper ledge than the second location.

Example 65 includes the portable trailer stand of example 64, wherein the handle is a first handle and the finger guard is a first finger guard, the portable trailer stand further including a second handle attached to the frame, the second handle spaced apart from the first handle in a direction along a longitudinal length of the upper ledge, and a second finger guard attached to the frame adjacent the second handle, the first and second handles and the first and second fingers guards offset on a same side of the upper ledge.

Example 66 includes the portable trailer stand of example 55, further including a sensor system to indicate when the upper ledge is in engagement with the underside of the trailer.

Example 67 includes the portable trailer stand of example 66, wherein the sensor system includes a visual indicator carried by the frame, the visual indicator moveable between a retracted position and an extended position, and a trigger to move from a first position to a second position in response to the upper ledge engaging the underside of the trailer, the visual indicator to be in the retracted position when the trigger is in the first position, the visual indicator to move to the extended position in response to the trigger moving to the second position.

Example 68 includes the portable trailer stand of example 67, wherein the visual indicator is more visually prominent when in the extended position than when in the retracted position.

Example 69 includes the portable trailer stand of example 66, wherein the sensor system includes a switch having a trigger extending above the upper ledge, the switch to generate an output signal in response to the trigger engaging the underside of the trailer, the output signal indicative of the upper ledge being in engagement with the underside of the trailer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A portable trailer stand, comprising:
a frame having an elongate upper ledge and a post;
an extendible leg coupled to the frame, the upper ledge vertically movable to selectively engage and disengage an underside of a trailer based on movement of the extendible leg relative to the frame; and
a plurality of wheels coupled to the frame, the post of the frame interconnecting the plurality of wheels to the upper ledge of the frame such that the plurality of wheels are to remain at a substantially fixed distance from the upper ledge as the upper ledge is vertically moved, each of the plurality of wheels to be spaced relative to a vertical axis, the vertical axis to intersect a center point of the upper ledge, wherein at least one wheel of the plurality of wheels lies in a plane that contains the vertical axis.

2. The portable trailer stand of claim 1, wherein different ones of the plurality of wheels are connected to the post via arms extending radially outward from the vertical axis.

3. The portable trailer stand of claim 1, wherein a first wheel of the plurality of wheels is located on a first side of a vertical plane and a second wheel of the plurality of wheels is located on a second side of the vertical plane, the first side opposite the second side, the vertical plane including the vertical axis and parallel to the upper ledge.

4. The portable trailer stand of claim 1, further including a handle coupled to the frame.

5. The portable trailer stand of claim 4, wherein the handle is coupled to the frame via the post.

6. The portable trailer stand of claim 1, further including a screw and a nut, the extendible leg coupled to a first one of the screw or the nut, the post coupled to a second one of the screw or the nut, the extendible leg moves relative to the post in response to relative motion of the screw relative to the nut.

7. The portable trailer stand of claim 1, further including a sensor system to generate an output signal when the upper ledge engages or disengages the underside of the trailer.

8. The portable trailer stand of claim 7, wherein the sensor system includes:
a visual indicator carried by the frame, the visual indicator moveable between a retracted position and an extended position; and
a trigger to move from a first position to a second position in response to the upper ledge engaging the underside of the trailer, the visual indicator to be in the retracted position when the trigger is in the first position, the visual indicator to move to the extended position in response to the trigger moving to the second position.

9. The portable trailer stand of claim 1, wherein each of the plurality of wheels are spaced a substantially equal distance from the vertical axis.

10. A portable trailer stand, comprising:
an elongate upper ledge;
a post coupled to the upper ledge;
an extendible leg telescopically coupled to the post, the upper ledge being vertically movable to selectively engage and disengage an underside of a trailer based on movement of the extendible leg relative to the post; and
a plurality of wheels coupled to the post, the post to maintain the plurality of wheels at a substantially fixed distance from the upper ledge as the upper ledge is vertically moved, each of the plurality of wheels to be equidistant from a vertical axis traversing through a center of the upper ledge, wherein at least one wheel of the plurality of wheels lies in a plane that contains the vertical axis.

11. The portable trailer stand of claim 10, wherein the plurality of wheels are coupled to the post adjacent a first end of the post and the upper ledge is coupled to the post adjacent a second end of the post opposite the first end.

12. The portable trailer stand of claim 10, further including a plurality of feet, the plurality of feet spaced horizontally from the vertical axis.

13. The portable trailer stand of claim 10, wherein the post is one of a plurality of posts, at least one of the posts coupled to the upper ledge via a bearing and coupled to a jackscrew via a nut, the jackscrew coupled to the extendible leg such that rotation of the at least one of the posts relative to the jackscrew produces translational movement of the extendible leg relative to the upper ledge.

14. The portable trailer stand of claim 13, further including a handle coupled to the at least one of the posts to facilitate rotation of the at least one of the posts relative to the jackscrew.

15. A portable trailer stand, comprising:
an upper ledge having a length and a width, the length greater than the width;
a retractable leg coupled to the upper ledge, the upper ledge moveable to selectively engage and disengage an underside of a trailer responsive to vertical movement of the retractable leg relative to the upper ledge; and
a plurality of wheels, each of the plurality of wheels spaced from a center point of the upper ledge, at least one wheel of the plurality of wheels is closer to the center point of the upper ledge than the at least one wheel is to the retractable leg.

16. The portable trailer stand of claim 15, wherein the retractable leg vertically aligns with the center point of the upper ledge.

17. The portable trailer stand of claim 15, wherein the retractable leg is spaced apart from the center point of the upper ledge.

18. The portable trailer stand of claim 15, wherein the plurality of wheels couple to the upper ledge via a plurality of posts such that the wheels remain a substantially fixed distance from the center point of the upper ledge as the upper ledge moves in at least one of an upward direction or a downward direction.

19. The portable trailer stand of claim 18, wherein the plurality of posts include a first post and a second post, the first post opposite the second post relative to the center point of the upper ledge, a first wheel of the plurality of wheels closer to the first post than the first wheel is to the second post, and a second wheel of the plurality of wheels closer to the second post than the second wheel is to the first post.

20. The portable trailer stand of claim 15, wherein the plurality of wheels includes more than two wheels.

* * * * *